US 11,958,655 B2

(12) United States Patent
Yamaji et al.

(10) Patent No.: US 11,958,655 B2
(45) Date of Patent: Apr. 16, 2024

(54) PHARMACEUTICAL STORAGE BOX

(71) Applicant: PHC Holdings Corporation, Tokyo (JP)

(72) Inventors: Hiroki Yamaji, Kagawa (JP); Motohiro Kawakami, Ehime (JP); Hideyuki Morii, Ehime (JP)

(73) Assignee: PHC HOLDINGS CORPORATION, Tokyo (JP)

( * ) Notice: Subject to any disclaimer, the term of this patent is extended or adjusted under 35 U.S.C. 154(b) by 74 days.

(21) Appl. No.: 17/957,840

(22) Filed: Sep. 30, 2022

(65) Prior Publication Data

US 2023/0023992 A1   Jan. 26, 2023

Related U.S. Application Data

(63) Continuation of application No. PCT/JP2021/008260, filed on Mar. 3, 2021.

(30) Foreign Application Priority Data

Apr. 6, 2020   (JP) .................................. 2020-068398

(51) Int. Cl.
*A61J 1/00*   (2023.01)
*B65D 6/00*   (2006.01)
(Continued)

(52) U.S. Cl.
CPC .............. *B65D 11/10* (2013.01); *B65D 11/20* (2013.01); *F25D 25/005* (2013.01); *G06K 19/07758* (2013.01); *A61J 1/00* (2013.01)

(58) Field of Classification Search
CPC ....... B65D 11/18; B65D 11/20; F25D 25/005; G06K 19/07758; G06K 7/10356; A61J 1/00; G16H 40/40
(Continued)

(56) References Cited

U.S. PATENT DOCUMENTS 10,019,694 B2   7/2018   Elizondo
10,932,989 B1 *  3/2021   McLean .................. A61J 1/165
(Continued)

FOREIGN PATENT DOCUMENTS

CN   107010298 A   8/2017
FR   2693984 A1   1/1994
(Continued)

OTHER PUBLICATIONS

Extended European Search Report dated Jul. 6, 2023 issued in the corresponding European Patent Application No. 21784238.4.
(Continued)

*Primary Examiner* — Jacob K Ackun

(74) *Attorney, Agent, or Firm* — Rimon P.C.

(57) ABSTRACT

A pharmaceutical storage box to be stored in a pharmaceutical refrigerator so as to be freely movable in and out of the pharmaceutical refrigerator, the pharmaceutical storage box including: a bottom plate on which a pharmaceutical is placed, the pharmaceutical having an attached IC tag; a first side plate having an attached first antenna, the first side plate removably connected to a first end surface of the bottom plate; a second side plate removably connected to a second end surface of the bottom plate; and a back plate removably connected to a third end surface of the bottom plate, wherein the first side plate has a first connection structure connectable to the second end surface, wherein the second side plate has a second connection structure that is connectable to the first end surface.

7 Claims, 21 Drawing Sheets

(51) Int. Cl.
*F25D 25/00* (2006.01)
*G06K 19/077* (2006.01)

(58) Field of Classification Search
USPC .......................................... 235/385; 206/438
See application file for complete search history.

(56) References Cited

U.S. PATENT DOCUMENTS

| | | | | |
|---|---|---|---|---|
| 2006/0000225 | A1* | 1/2006 | Locher | F25D 25/025 236/51 |
| 2006/0028392 | A1* | 2/2006 | Coveley | G07F 9/026 343/893 |
| 2006/0125639 | A1* | 6/2006 | Jung | G06K 7/10336 340/572.8 |
| 2007/0272746 | A1* | 11/2007 | Ortiz | G06K 17/00 705/28 |
| 2008/0284604 | A1* | 11/2008 | Rubinstein | G06Q 50/12 340/572.4 |
| 2014/0244289 | A1* | 8/2014 | Lowenstein | G16Z 99/00 705/2 |
| 2018/0372398 | A1* | 12/2018 | Cosgrove | G06Q 20/208 |
| 2019/0340855 | A1* | 11/2019 | Clouser | G07C 9/00182 |
| 2020/0132362 | A1 | 4/2020 | Ito | |
| 2021/0158954 | A1 | 5/2021 | Okuda et al. | |
| 2021/0205172 | A1* | 7/2021 | Miyazaki | G16H 70/40 |

FOREIGN PATENT DOCUMENTS

| | | |
|---|---|---|
| JP | S59-018271 U | 2/1984 |
| JP | 2000-105149 A | 4/2000 |
| JP | 2002-257467 A | 9/2002 |
| JP | 2003-341652 A | 12/2003 |
| JP | 2005-249355 A | 9/2005 |
| JP | 2010-071527 A | 4/2010 |
| WO | 2019/030969 A1 | 2/2019 |
| WO | 2020/026602 A1 | 2/2020 |

OTHER PUBLICATIONS

International Search Report dated Apr. 13, 2021 in International Patent Application No. PCT/JP2021/008260, with English translation.

Notice of Reasons for Refusal dated Mar. 7, 2023 issued in the corresponding Japanese Patent Application No. 2022-514337, with English translation.

* cited by examiner

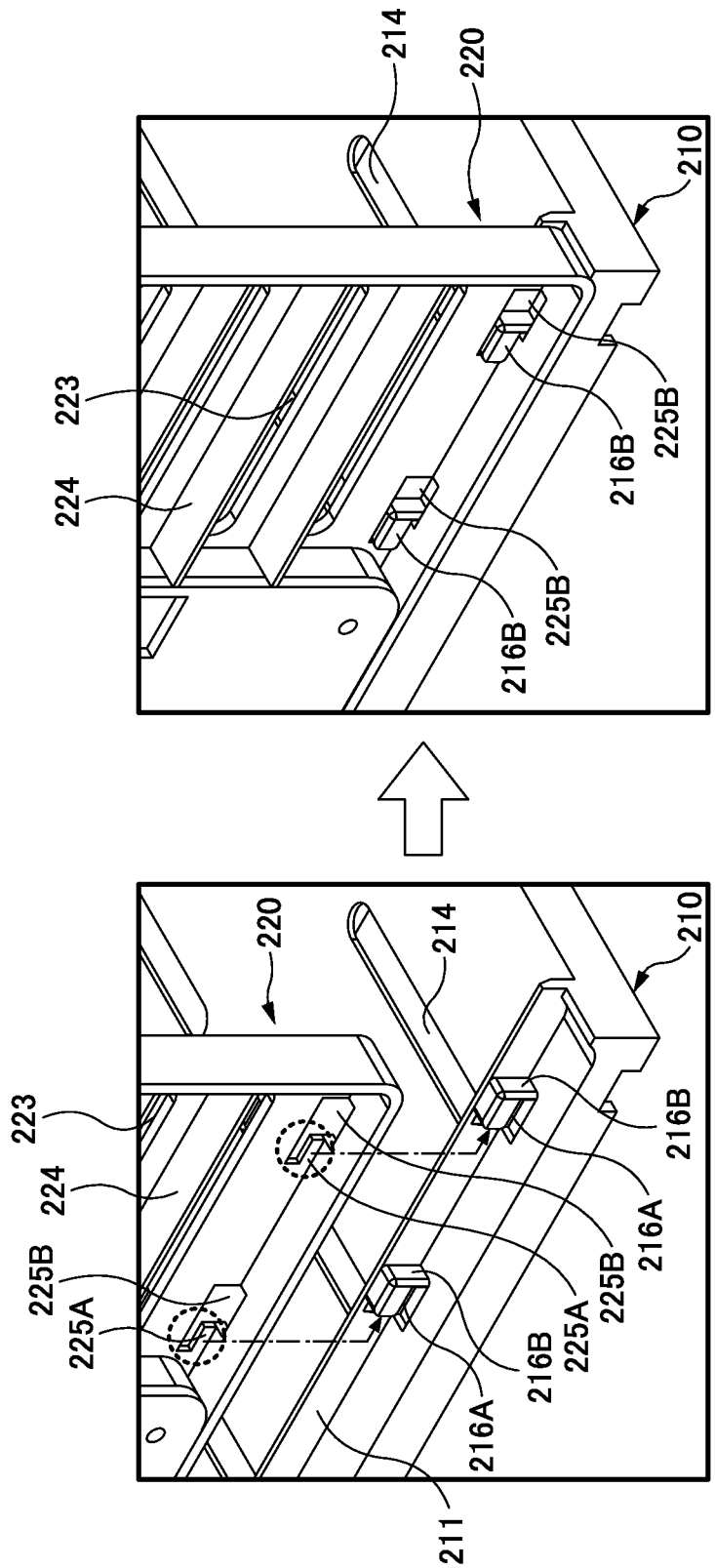

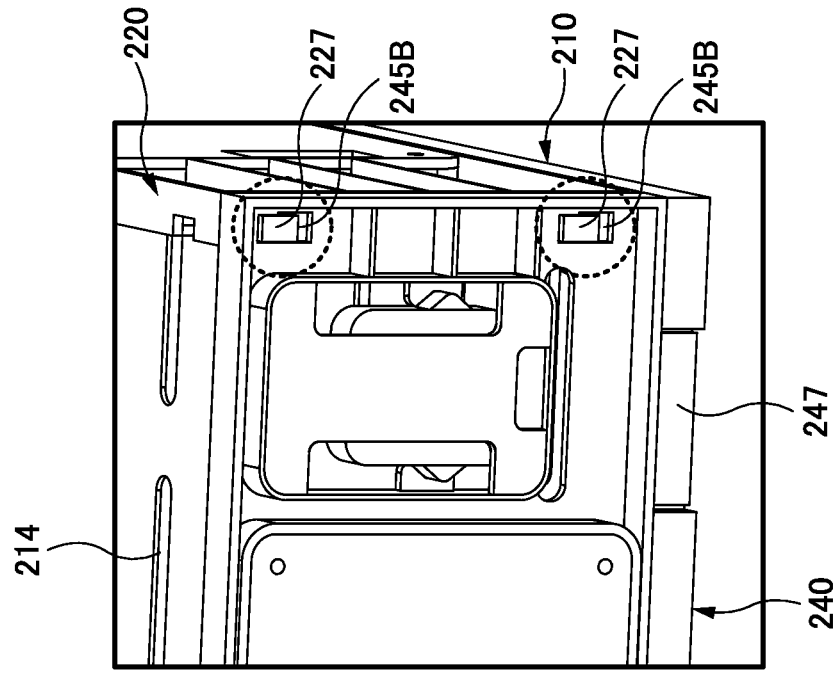
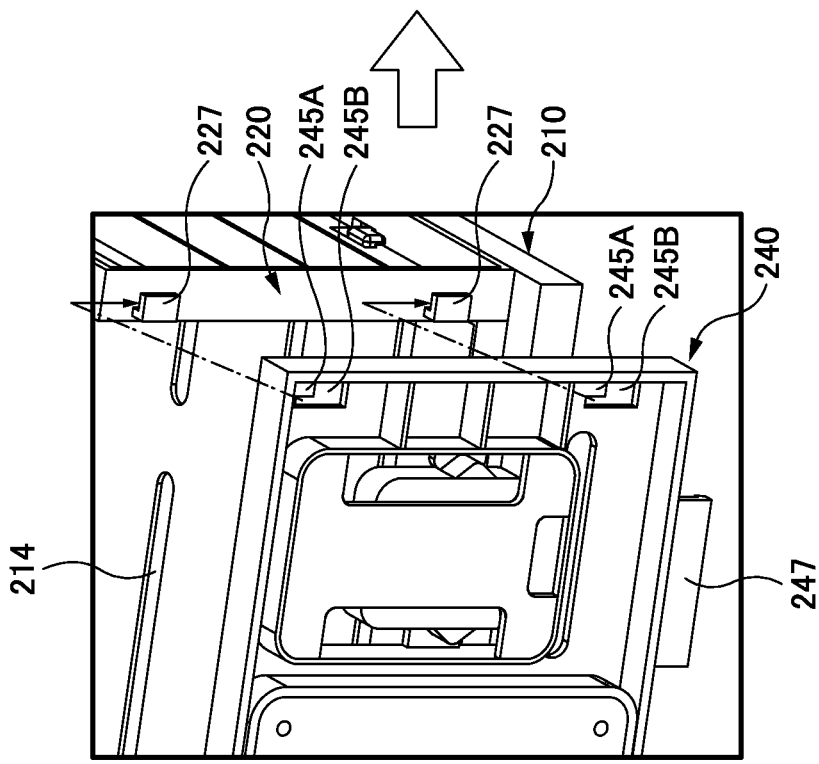

PHARMACEUTICAL STORAGE BOX

CROSS-REFERENCE TO RELATED APPLICATIONS

This is a continuation application of International Patent Application No. PCT/JP2021/008260 filed Mar. 3, 2021, which claims the benefit of priority to Japanese Patent Application No. 2020-068398 filed Apr. 6, 2020, the entire contents of each of which are incorporated herein by reference.

BACKGROUND

Technical Field

The present disclosure relates to pharmaceutical storage boxes.

Description of the Related Art

For example, pharmaceutical refrigerators to store and manage pharmaceuticals under an environment with a predetermined storage temperature are known for (see, for example, Japanese Patent Application Publication No. 2000-105149).

Pharmaceuticals in a pharmaceutical refrigerator are under an environment at a predetermined storage temperature. However, the management of the information about their entry and exit into/from the refrigerator is currently insufficient. Thus, in medical institutions and other facilities, the necessary and sufficient management of pharmaceuticals may become impossible in medical institutions and other facilities.

SUMMARY

An aspect of an embodiment of the present disclosure is a pharmaceutical storage box to be stored in a pharmaceutical refrigerator so as to be freely movable in and out of the pharmaceutical refrigerator, the pharmaceutical storage box being managed by a control device, the pharmaceutical storage box comprising: a bottom plate on which a pharmaceutical is to be placed thereon, the pharmaceutical having an IC tag attached thereto; a first side plate having a first antenna attached thereto, the first antenna being configured to receive information of the IC tag, the first side plate being configured to be removably connected to a first end surface of the bottom plate such that the first antenna is on the side directed to the bottom plate; a second side plate configured to be removably connected to a second end surface of the bottom plate such that the second side plate faces the first side plate; and a back plate configured to be removably connected to a third end surface of the bottom plate such that the back plate is sandwiched between the first side plate and the second side plate, wherein the first side plate has a first connection structure that is connectable to the second end surface such that the first antenna is on the side directed to the bottom plate, with positions of an edge of the first side plate on a side to be connected to the first end surface and an edge thereof on an opposite side not to be connected to the first end surface being reversed, and wherein the second side plate has a second connection structure that is connectable to the first end surface with positions of an edge of the second side plate on a side to be connected to the second end surface and an edge thereof on an opposite side not to be connected to the second end surface being reversed.

Other features of the present disclosure will become apparent from the following description and the accompanying drawings.

BRIEF DESCRIPTION OF THE DRAWINGS

FIG. 11A is a perspective view of main components illustrating how a first side plate according to an embodiment of the present disclosure is connected to a bottom plate.

FIG. 11B is a perspective view of main components illustrating how a first side plate according to an embodiment of the present disclosure is connected to a bottom plate.

FIG. 12A is a perspective view of main components illustrating how a back plate according to an embodiment of the present disclosure is connected to one of side plates.

FIG. 12B is a perspective view of main components illustrating how a back plate according to an embodiment of the present disclosure is connected to one of side plates.

DETAILED DESCRIPTION

At least the following matters will be apparent from illustration in the description and the attached drawings.

Pharmaceutical Refrigerator

Figure 1:
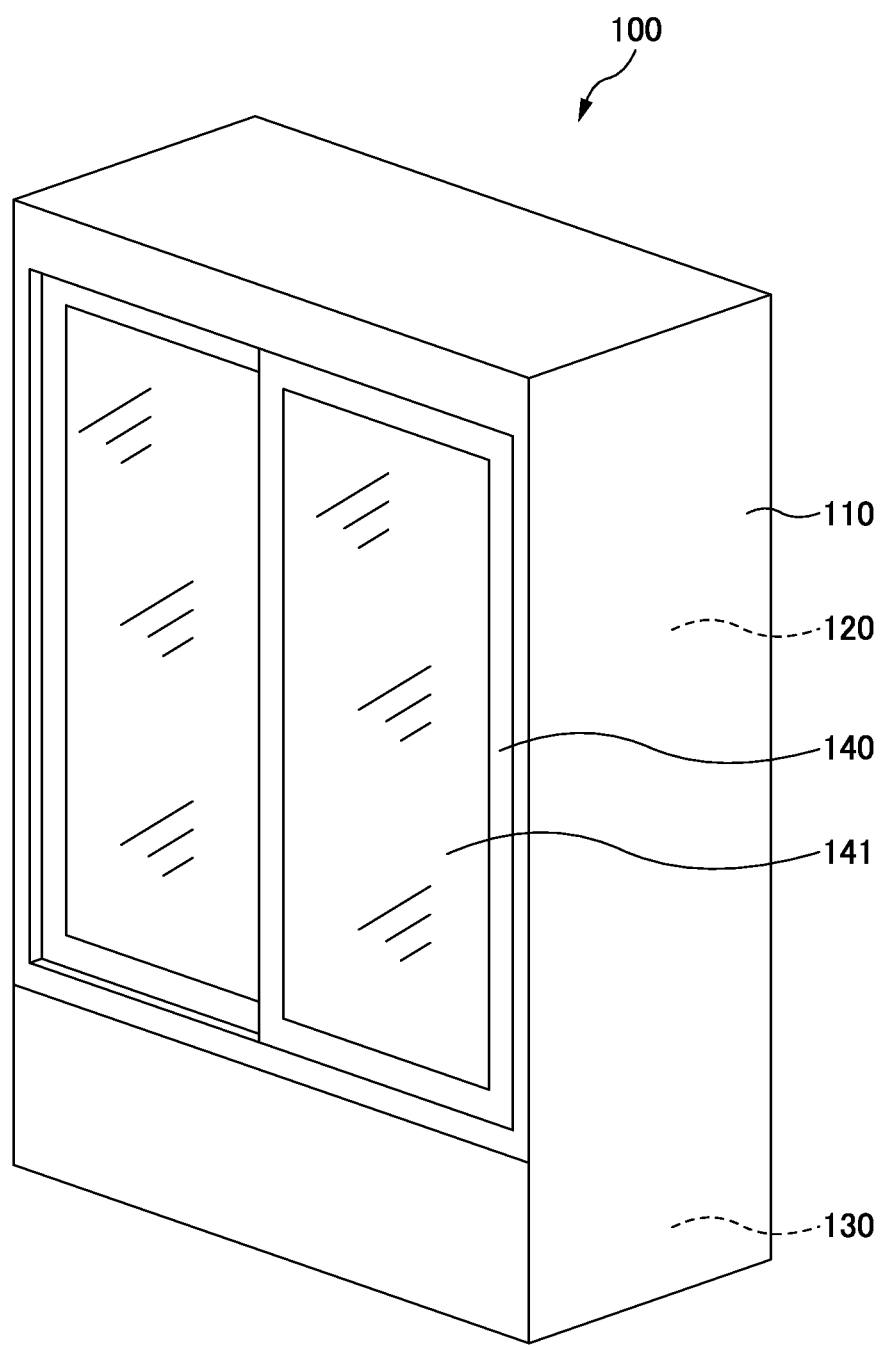
FIG. 1 is a perspective view illustrating an example of a pharmaceutical refrigerator in which a pharmaceutical storage box according to an embodiment of the present disclosure is to be stored.
Figure 2:
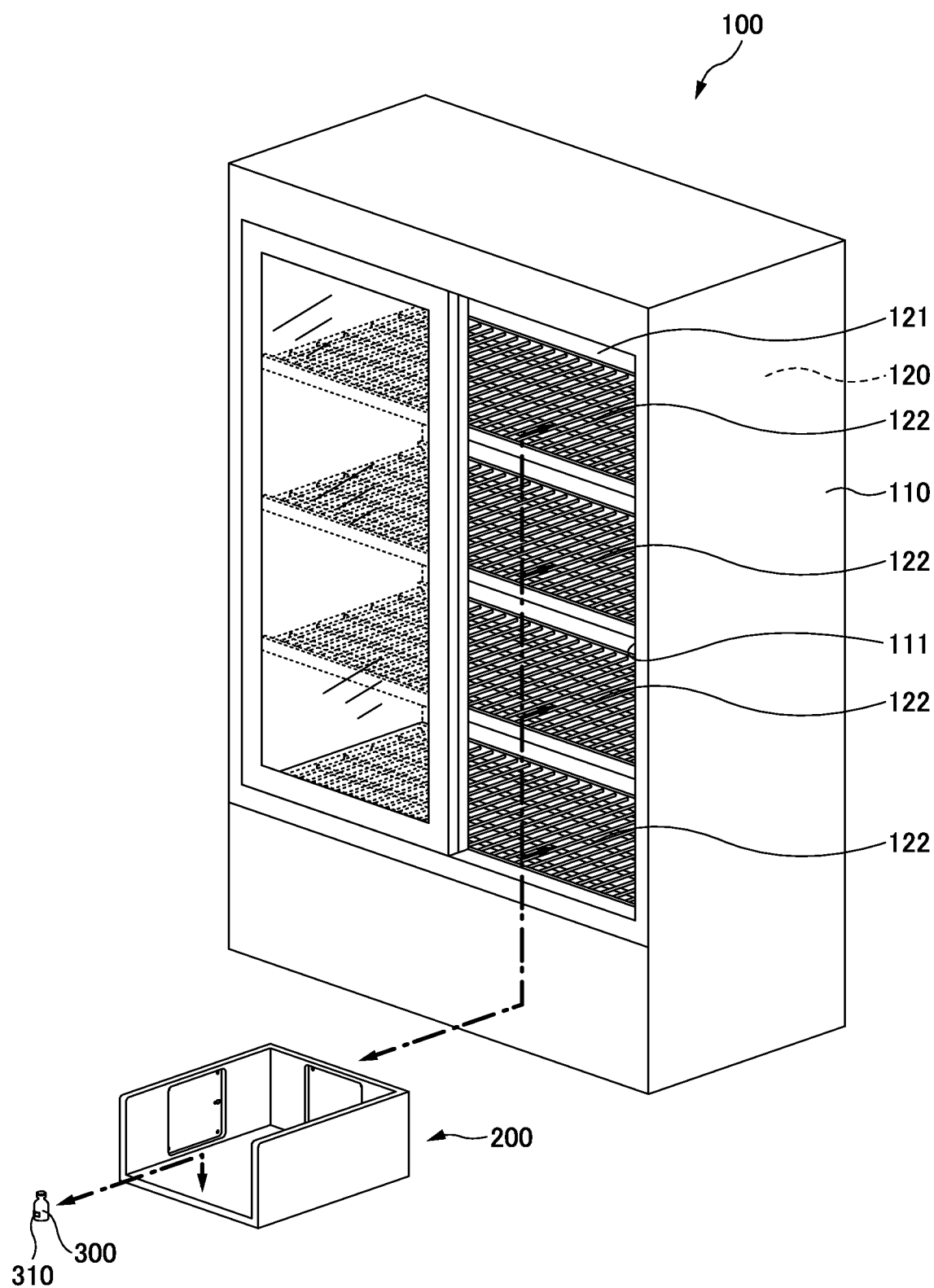
FIG. 2 is a perspective view illustrating how a pharmaceutical storage box according to an embodiment of the present disclosure is moved into and out of a pharmaceutical refrigerator illustrated in FIG. 1.

FIG. 1 is a perspective view illustrating an example of a pharmaceutical refrigerator in which s pharmaceutical storage box according to an embodiment of the present disclosure is to be stored. FIG. 2 is a perspective view illustrating how the pharmaceutical storage box according to an embodiment of the present disclosure is moved into and out of the pharmaceutical refrigerator of FIG. 1.

A pharmaceutical refrigerator 100 is a device to be installed in, for example, medical institutions to retain pharmaceuticals produced by pharmaceutical manufacturers and provided by pharmaceutical wholesalers, and refrigerate them at a predetermined temperature or temperatures.

The pharmaceutical refrigerator 100 includes an outer case 110, an inner case 120, a machinery room 130, and a door 140.

The outer case 110 has a rectangular parallel pipe shape with an opening 111, in its front face, through which pharmaceuticals are carried in and out. The inner case 120 has a rectangular parallel pipe shape with an opening 121, in its front face, allowing communication with the opening 111. The inner case 120 is provided in the outer case 110 with a heat insulating material provided therebetween. The inner case 120 has multiple shelves 122 to receive the pharmaceuticals. The shelves 122 are made of, for example, stainless steel and are in the form of, for example, mesh to ensure ventilation. The machinery room 130 is formed, below the inner case 120, in the outer case 110. A cooling device (not illustrated) is provided to refrigerate inside the inner case 120. The cooling device circulates a coolant using, for example, a compressor, condenser, and evaporator, and the like, and is connected to the inner case 120 so that air at a predetermined refrigerating temperature circulates in the inner case 120. The door 140 has a glass window 141 to check the inside of the inner case 120 and is attached to the opening 111 of the outer case 110 so as to be slidable. The inner case 120 can be used as a sealed space to refrigerate the pharmaceuticals therein, with the door 140 closed.

It is assumed, in an embodiment of the present disclosure, that a pharmaceutical storage box 200 to store pharmaceutical(s) to be managed is to be placed on the shelf 122 in the inner case 120 of the pharmaceutical refrigerator 100 such that the pharmaceutical storage box 200 is freely movable into and out of the pharmaceutical refrigerator 100 through the openings 111 and 121. In an embodiment of the present disclosure, two types of pharmaceutical storage boxes 200A and 200B can be prepared as the pharmaceutical storage boxes 200. The details thereof will be described below.

Pharmaceutical Storage Box

Figure 3A:
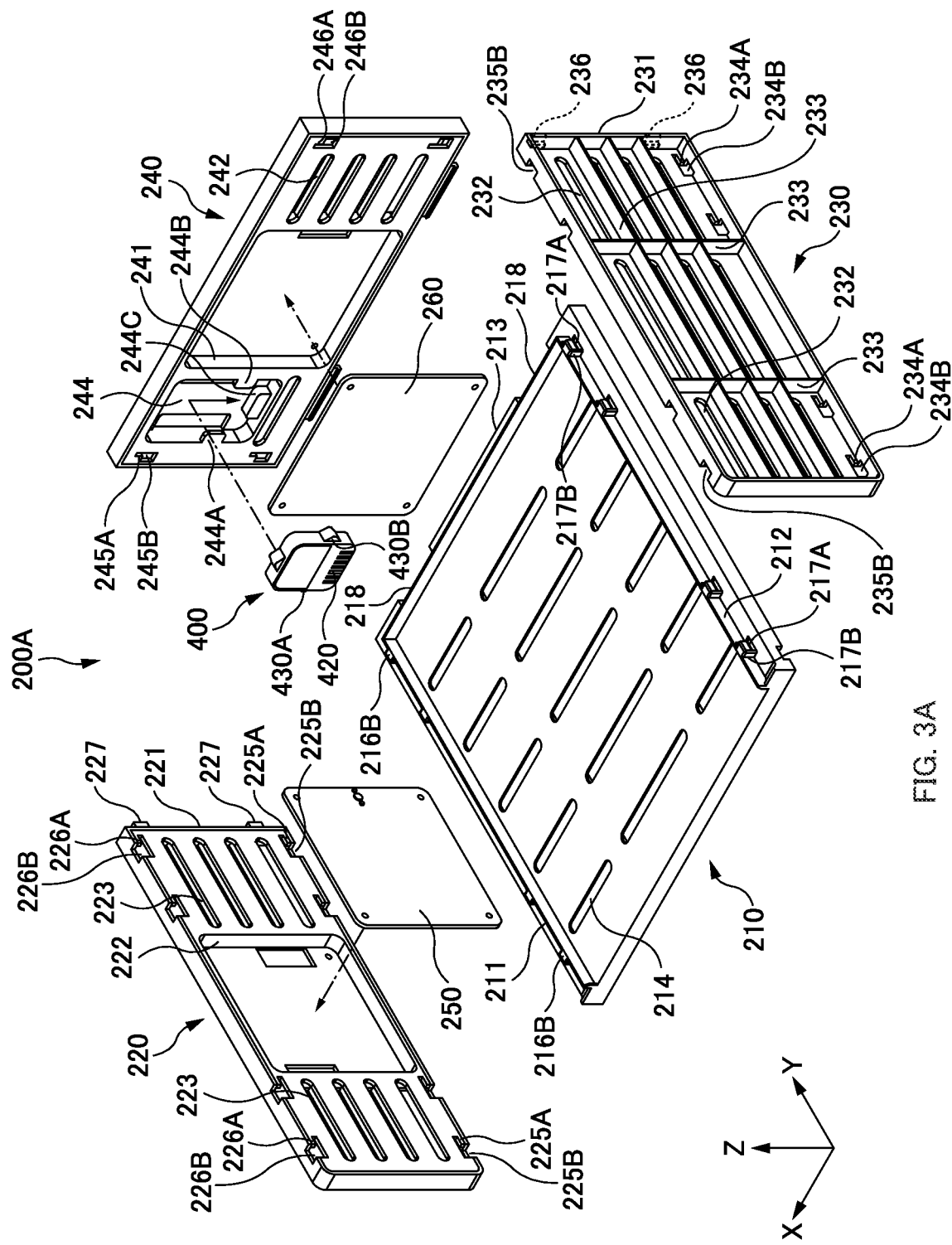
FIG. 3A is an exploded perspective view illustrating a pharmaceutical storage box 200A according to an embodiment of the present disclosure.
Figure 3B:
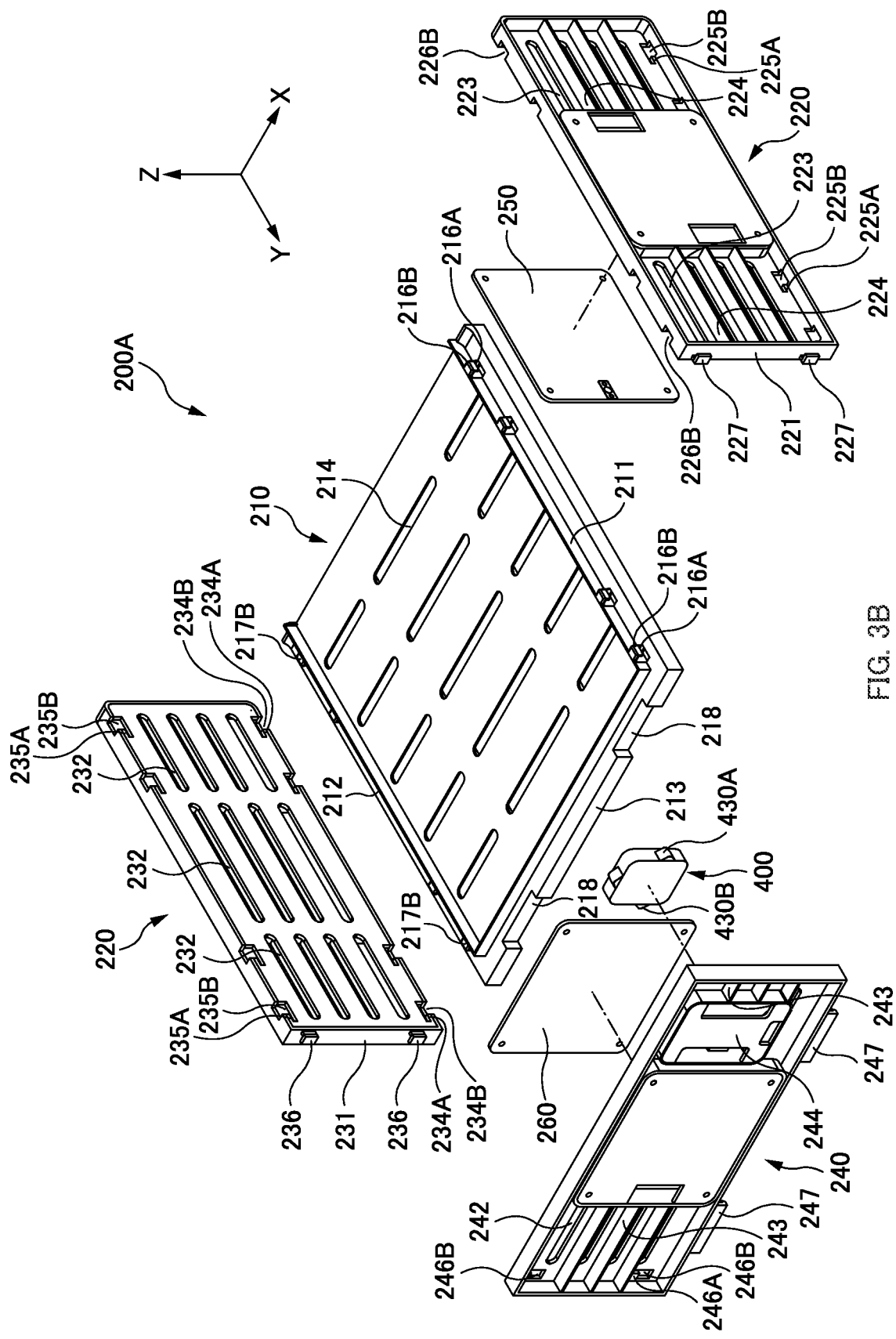
FIG. 3B is an exploded perspective view of a pharmaceutical storage box 200A illustrated in FIG. 3A, when viewed from another direction.
Figure 4:
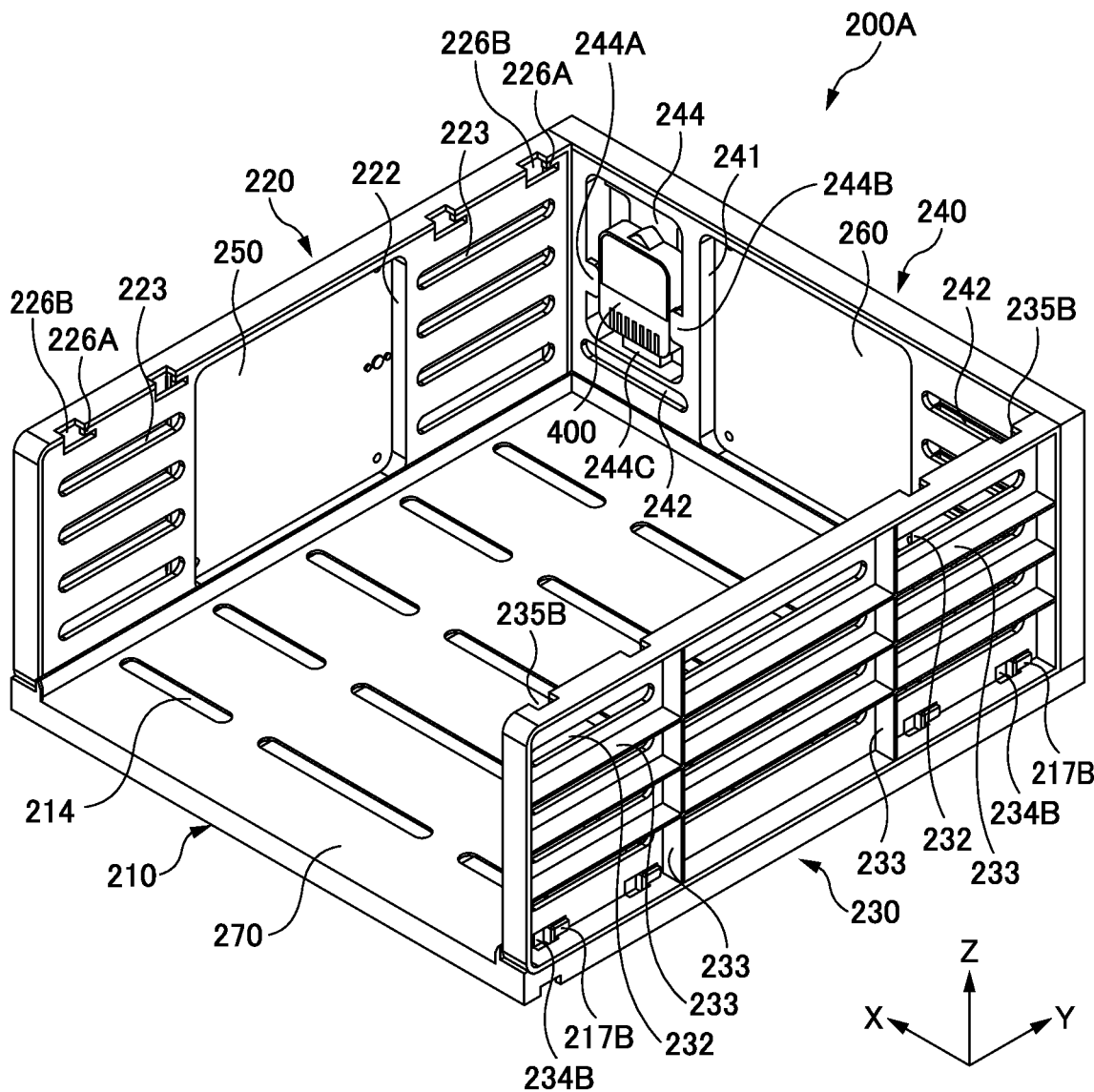
FIG. 4 is a perspective view illustrating a pharmaceutical storage box 200A illustrated in FIGS. 3A and 3B.
Figure 5A:
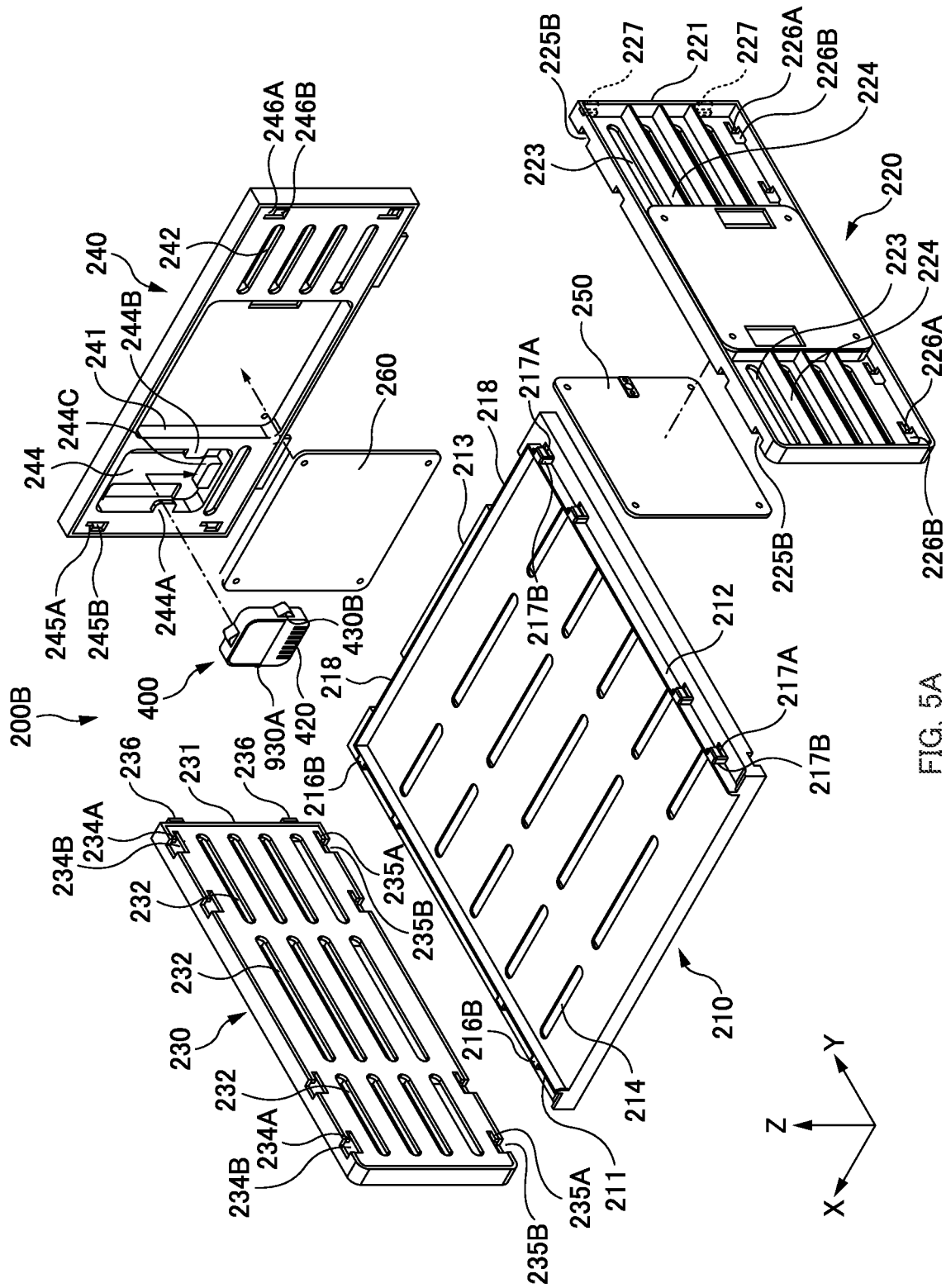
FIG. 5A is an exploded perspective view illustrating a pharmaceutical storage box 200B according to an embodiment of the present disclosure.
Figure 5B:
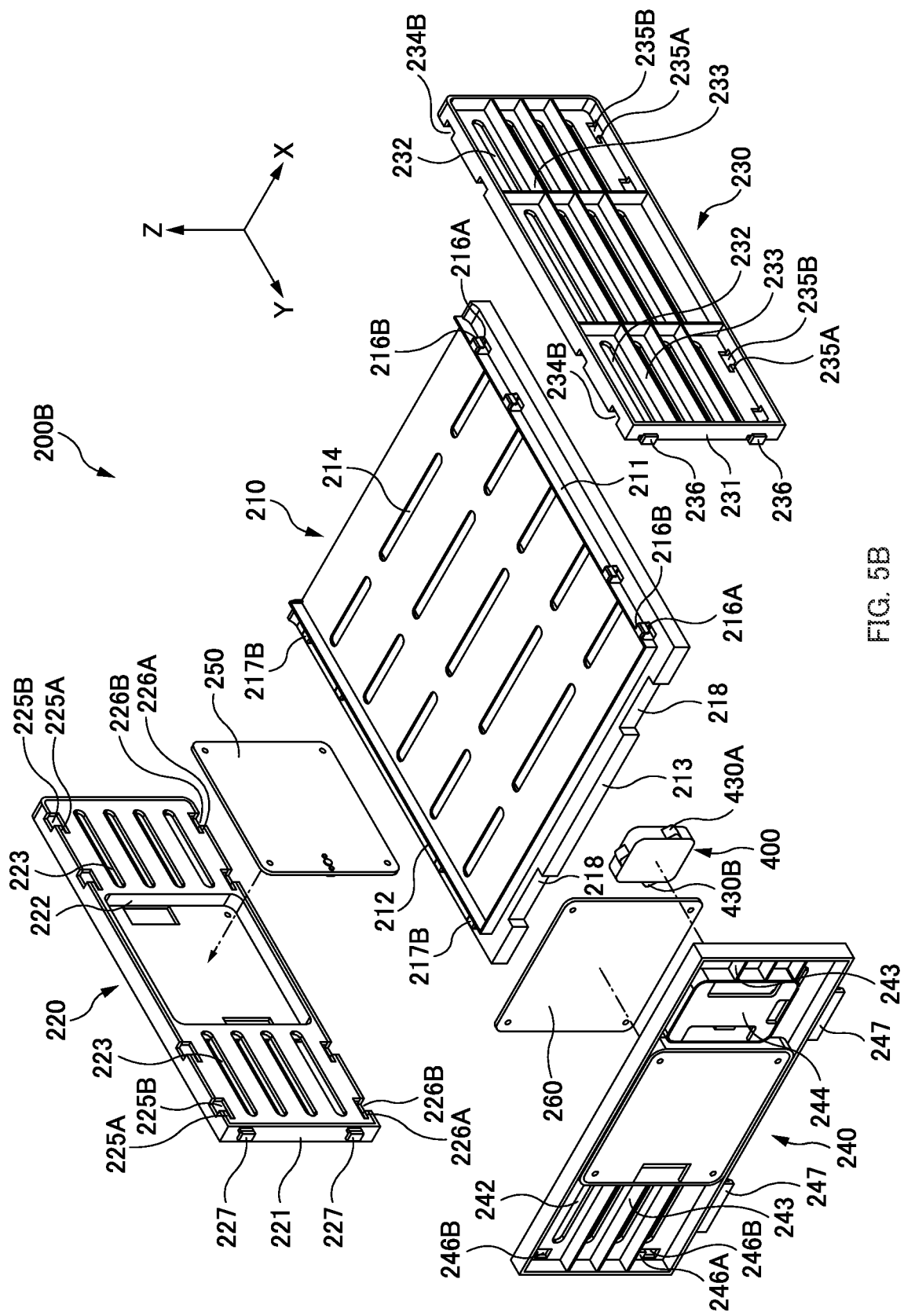
FIG. 5B is an exploded perspective view of a pharmaceutical storage box 200B illustrated in FIG. 5A, when viewed from another direction.
Figure 6:
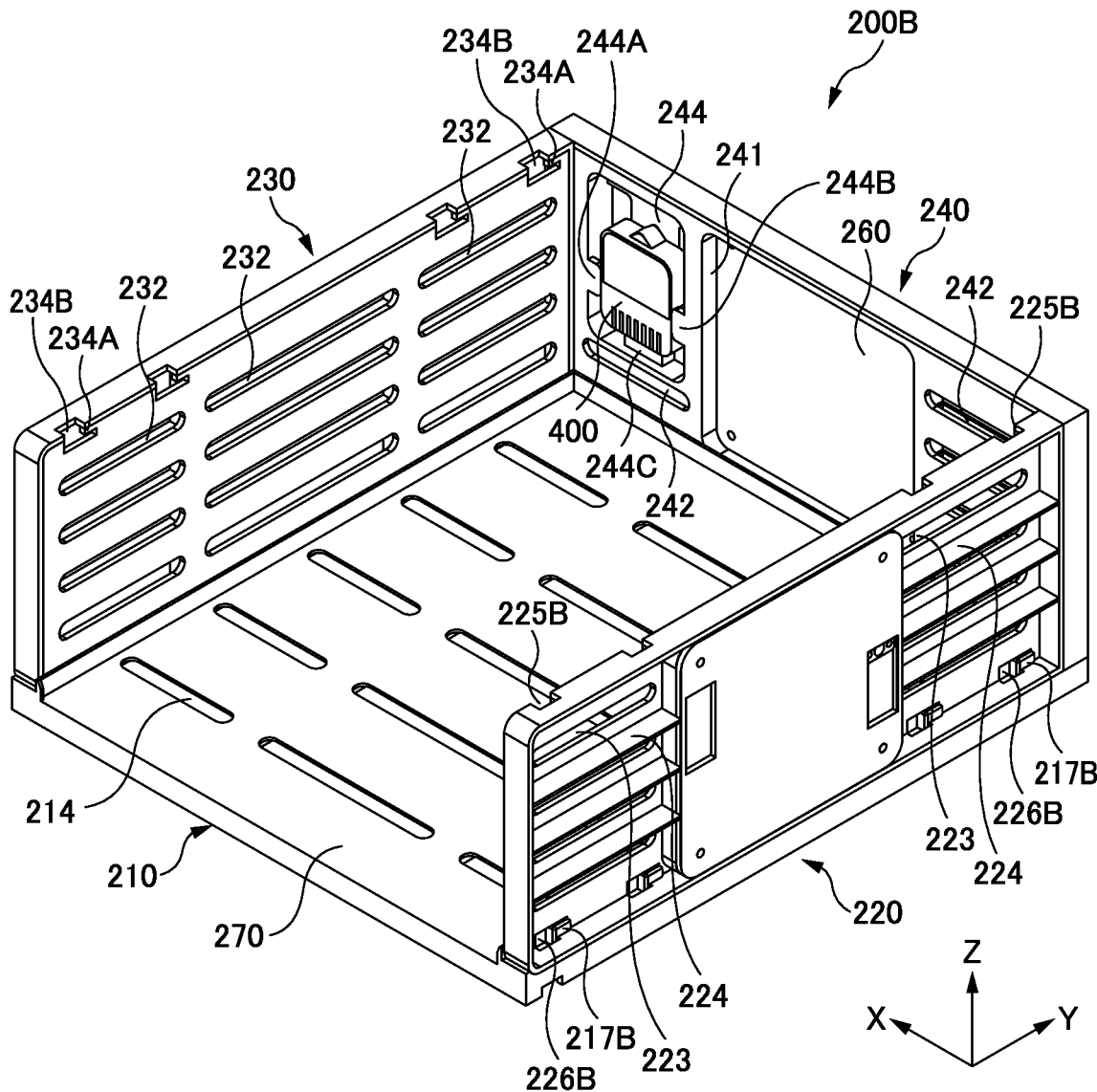
FIG. 6 is a perspective view illustrating a pharmaceutical storage box 200B illustrated in FIGS. 5A and 5B.
Figure 7A:
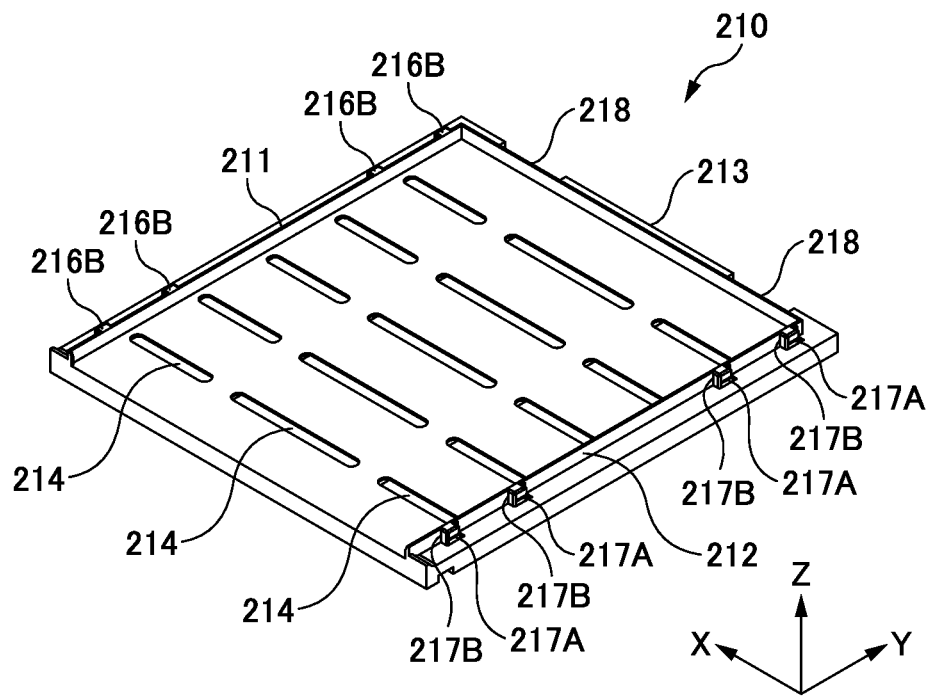
FIG. 7A is a perspective view illustrating an example of a bottom plate to be used in pharmaceutical storage boxes 200A and 200B according to an embodiment of the present disclosure.
Figure 7B:
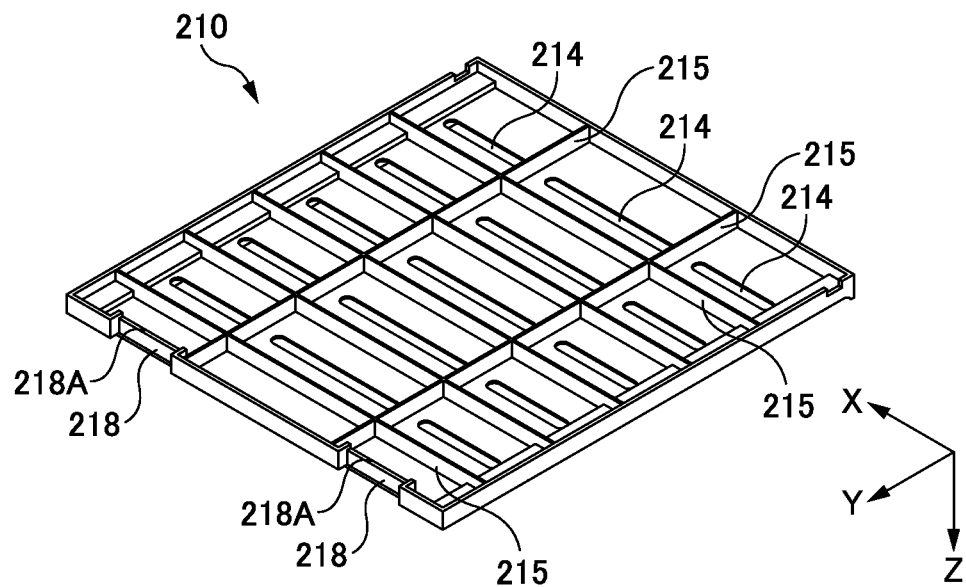
FIG. 7B is a perspective view of a bottom plate illustrated in FIG. 7A to be used in pharmaceutical storage boxes 200A and 200B, when viewed from another direction.
Figure 8A:
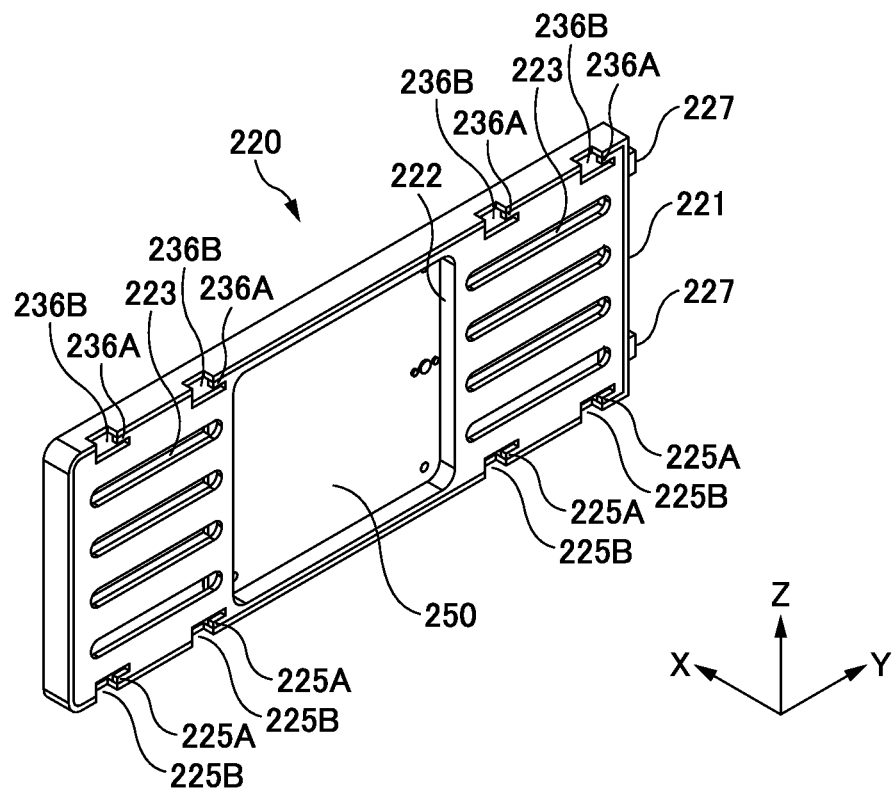
FIG. 8A is a perspective view illustrating an example of a first side plate to be used in pharmaceutical storage boxes 200A and 200B according to an embodiment of the present disclosure.
Figure 8B:
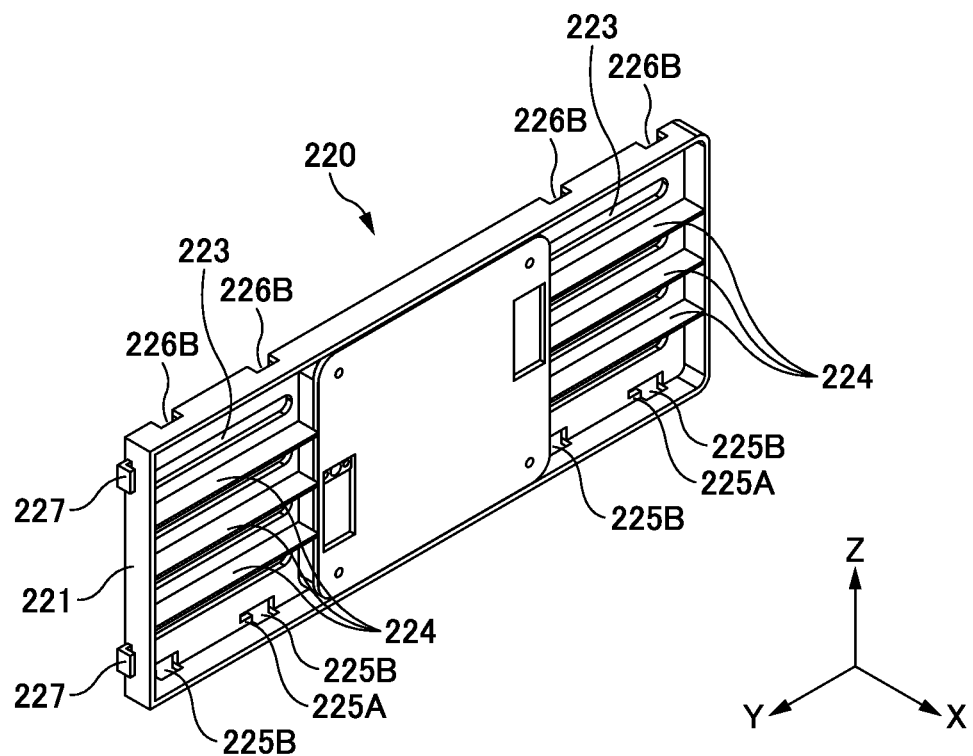
FIG. 8B is a perspective view of a first side plate illustrated in FIG. 8A to be used in pharmaceutical storage boxes 200A and 200B according to an embodiment of the present disclosure, when viewed from another direction.
Figure 9A:
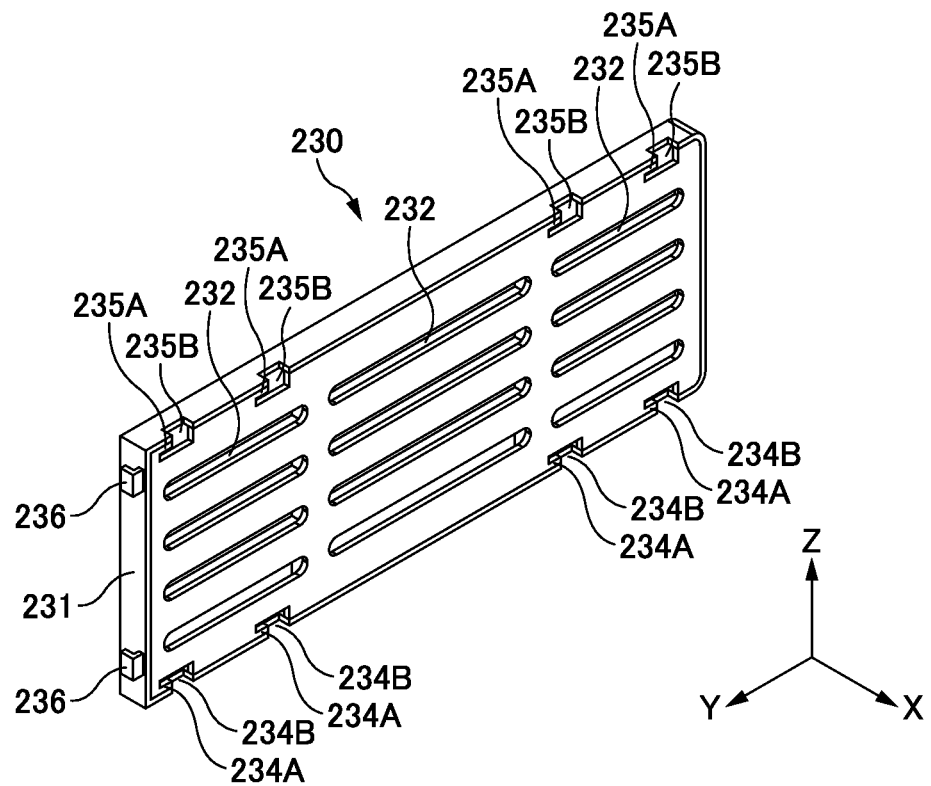
FIG. 9A is a perspective view illustrating an example of a second side plate to be used in pharmaceutical storage boxes 200A and 200B according to an embodiment of the present disclosure.
Figure 9B:
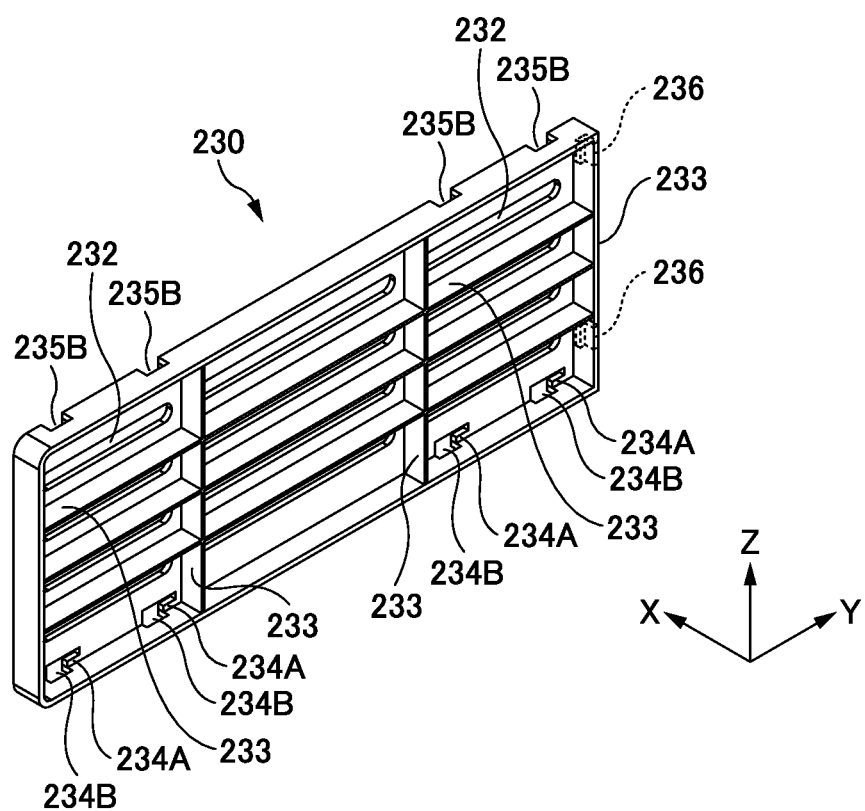
FIG. 9B is a perspective view of a second side plate illustrated in FIG. 9A to be used in pharmaceutical storage boxes 200A and 200B according to an embodiment of the present disclosure, when viewed from another direction.
Figure 10A:
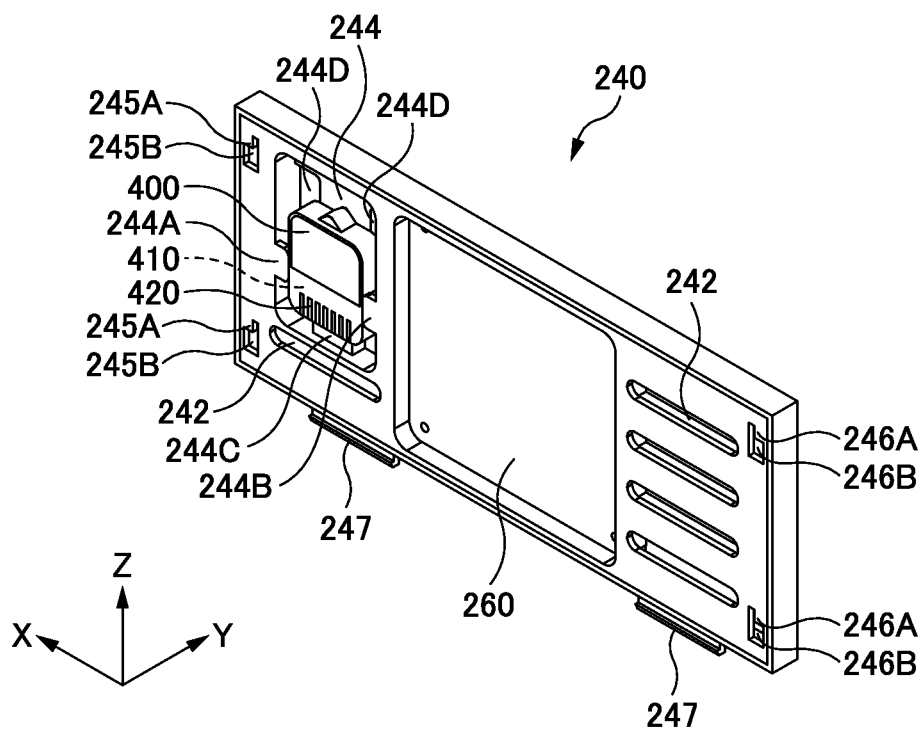
FIG. 10A is a perspective view illustrating an example of a back plate to be used in pharmaceutical storage boxes 200A and 200B according to an embodiment of the present disclosure.
Figure 10B:
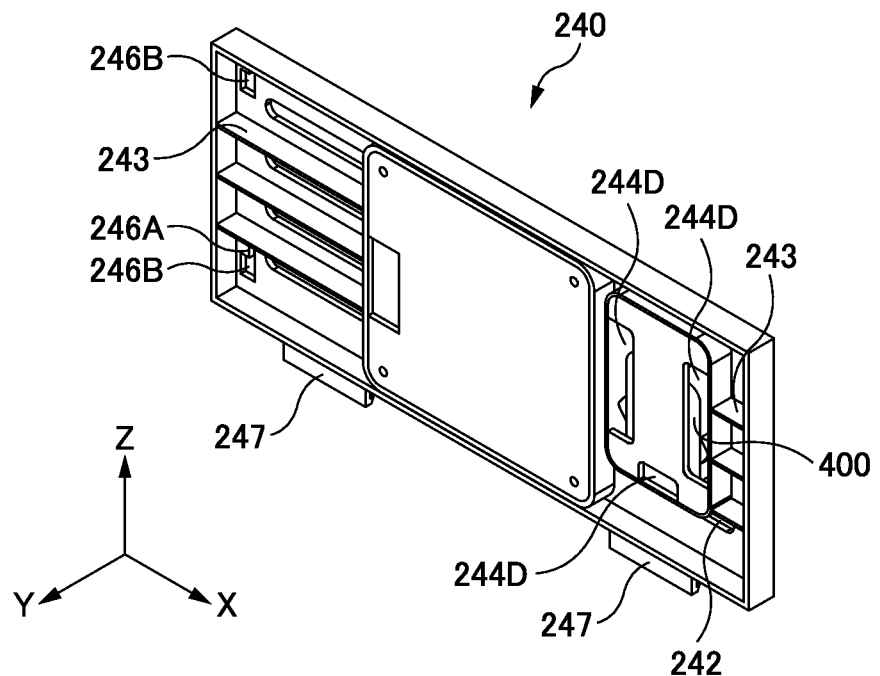
FIG. 10B is a perspective view of a back plate illustrated in FIG. 10A to be used in pharmaceutical storage boxes 200A and 200B according to an embodiment of the present disclosure, when viewed from another direction.
Figure 13:
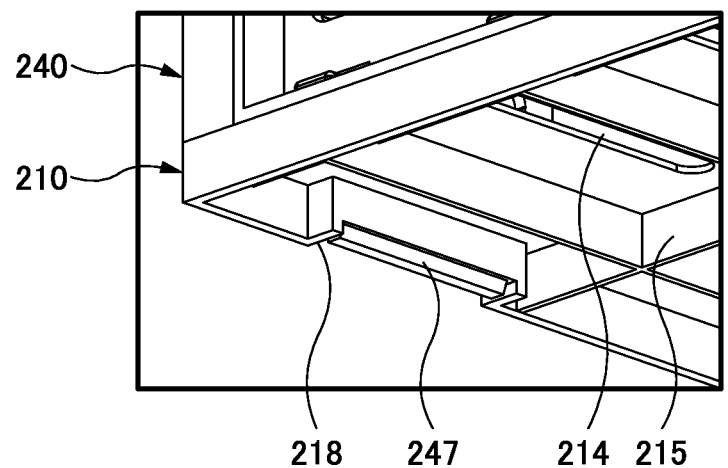
FIG. 13 is a perspective view of main components illustrating how a back plate according to an embodiment of the present disclosure is connected to a bottom plate.

FIG. 3A is an exploded perspective view illustrating a pharmaceutical storage box 200A according to an embodiment of the present disclosure. FIG. 3B is an exploded perspective view of the pharmaceutical storage box 200A according to an embodiment of the present disclosure, when viewed from another direction. FIG. 4 is a perspective view illustrating the pharmaceutical storage box 200A according to an embodiment of the present disclosure. FIG. 5A is an exploded perspective view illustrating a pharmaceutical storage box 200B according to an embodiment of the present disclosure. FIG. 5B is an exploded perspective view of the pharmaceutical storage box 200B according to an embodiment of the present disclosure, when viewed from another direction. FIG. 6 is a perspective view illustrating the pharmaceutical storage box 200B according to an embodiment of the present disclosure. FIG. 7A is a perspective view illustrating an example of a bottom plate to be used in the pharmaceutical storage boxes 200A and 200B according to an embodiment of the present disclosure. FIG. 7B is a perspective view of the bottom plate to be used in the pharmaceutical storage boxes 200A and 200B according to an embodiment of the present disclosure, when viewed from another direction. FIG. 8A is a perspective view illustrating an example of a first side plate to be used in the pharmaceutical storage boxes 200A and 200B according to an embodiment of the present disclosure. FIG. 8B is a perspective view of the first side plate to be used in the pharmaceutical storage boxes 200A and 200B according to an embodiment of the present disclosure, when viewed from another direction. FIG. 9A is a perspective view illustrating an example of a second side plate to be used in the pharmaceutical storage boxes 200A and 200B according to an embodiment of the present disclosure. FIG. 9B is a perspective view of the second side plate to be used in the pharmaceutical storage boxes 200A and 200B according to an embodiment of the present disclosure, when viewed from another direction. FIG. 10A is a perspective view illustrating an example of a back plate to be used in the pharmaceutical storage boxes 200A and 200B according to an embodiment of the present disclosure. FIG. 10B is a perspective view of the back plate to be used in the pharmaceutical storage boxes 200A and 200B according to an embodiment of the present disclosure, when viewed from another direction. FIGS. 11A and 11B is a perspective view of main components illustrating how the first side plate according to an embodiment of the present disclosure is connected to the bottom plate. FIGS. 12A and 12B is a perspective view of main components illustrating how the back plate according to an embodiment of the present disclosure is connected to one of the side plates. FIG. 13 is a perspective view of main components illustrating how the back plate according to an embodiment of the present disclosure is connected to the bottom plate. In FIGS. 3 to 13, the X-, Y-, and Z-axes correspond to the width, depth, and height directions, respectively, of the pharmaceutical storage boxes 200A and 200B.

Pharmaceutical Storage Box 200A

The pharmaceutical storage box 200A is to store pharmaceutical(s) 300 to be managed.

The pharmaceutical storage box 200A includes a bottom plate 210, a first side plate 220, a second side plate 230, a back plate 240, a first antenna 250, and a second antenna 260, so as to store pharmaceutical(s) 300 therein.

The pharmaceutical storage box 200A forms therein a space to store pharmaceutical(s) 300, the space being defined and surrounded by four flat plates: the bottom plate 210, the first side plate 220, the second side plate 230, and the back plate 240. There is no plate standing at the end surface of the bottom plate 210 on the side opposite the back plate 240, to thereby form an access opening 270 through which the pharmaceutical(s) 300 is/are to be carried in and out. The access opening 270 faces toward the openings 111 and 121 when the pharmaceutical storage box 200A is placed on the shelf 122. This allows an operator, after opening the door 140, to reach into the access opening 270 through the openings 111 and 121 and carry the pharmaceutical(s) 300 in or out of the pharmaceutical storage box 200A.

In the pharmaceutical storage box 200A, the first side plate 220 is removably connected to a first end surface 211 of the bottom plate 210, extending along its depth direction (in the direction of the Y-axis) on the left side (+X side) of the paper plane, such that the first antenna 250 attached to the first side plate 220 is on the side directed to the bottom plate 210. The second side plate 230 is removably connected to a second end surface 212 of the bottom plate 210, extending along its depth direction (in the direction of the Y-axis) on the right side (-X side) of the paper plane. The back plate 240 is removably connected to an end surface 221 of the first side plate 220, extending along its height direction (in the direction of the Z-axis) on the far side (+Y side) of the paper plane, to an end surface 231 of the second side plate 230, extending along its height direction (in the direction of the Z-axis) on the far side (+Y side) of the paper plane, and to a third end surface 213 of the bottom plate 210, extending along its width direction (in the direction of the X-axis) on the far side (+Y side) of the paper plane.

The bottom plate 210, the first side plate 220, the second side plate 230, and the back plate 240 are individually formed by, for example, molding with a mold and a resin material, and then removably connected to one another.

Next, the details of the bottom plate 210, the first side plate 220, the second side plate 230, and the back plate 240 will be described.

Bottom Plate

The bottom plate 210 is of a plate material having a flat plate shape, and the pharmaceutical(s) 300 is/are to be placed thereon. It is assumed that the bottom plate 210 is formed by, for example, molding with a mold and a resin material, as described above. The surface of the bottom plate 210 on the upper side of the paper plane (+Z side) is formed to be flat such that pharmaceutical(s) 300 is/are placed stably.

The bottom plate 210 has ventilation holes 214 passing therethrough in its thickness direction (in the direction of the Z-axis) so that the pharmaceutical(s) 300 placed on the bottom plate 210 can be effectively refrigerated by the refrigerating air circulating in the inner case 120. The ventilation holes 214 each are in the form of, for example, a slit that is an elongated hole, and are aligned at regular intervals in the bottom plate 210 such that the pharmaceutical(s) 300 will not be inclined even if being on the ventilation hole(s) 214 when placed on the bottom plate 210.

The bottom plate 210 is formed relatively thin for weight reduction. To prevent the bottom plate 210 from bending even when multiple pharmaceuticals 300 are placed on it, reinforcing ribs 215 are integrally formed with the bottom plate 210 on its backside (-Z side) of the paper plane, extending along its width direction (in the direction of the X-axis) and its depth direction (in the direction of the Y-axis) such that they intersect one another while avoiding the ventilation holes 214.

For the selective connection of the first side plate 220 and the second side plate 230 to the bottom plate 210, four first mating protrusions 216B are formed on the first end surface 211 of the bottom plate 210 along its depth direction. Each first mating protrusion 216B extends outwardly from the first end surface 211 and is then bent downward (in the -Z direction) in an L shape to form a groove 216A. Each groove 216A is formed along the depth direction from the near side (-Y side) toward the far side (+Y side).

For the selective connection of the first side plate 220 and the second side plate 230 to the bottom plate 210, four second mating protrusions 217B are formed on the second end surface 212 of the bottom plate 210 along its depth direction. Each second mating protrusion 217B extends outwardly from the second end surface 212 and is bent downward (in the -Z direction) in an L shape to form a groove 217A. Each groove 217A is formed along the depth direction from the near side (-Y side) to the far side (+Y side).

Two depressions 218 are formed in the third end surface 213 of the bottom plate 210 to connect the back plate 240 to the bottom plate 210.

First Side Plate

The first side plate 220 is a flat-plate-shaped member and is configured to be removably connected selectively to the first end surface 211 and the second end surface 212 of the bottom plate 210. The first side plate 220 is formed by molding with a mold and a resin material, as described above.

To identify the pharmaceuticals 300 on the bottom plate 210, an IC tag 310 is attached to each of the pharmaceuticals 300. It is assumed in an embodiment of the present disclosure that such an IC tag 310 is, for example, a passive-type RFID tag with a loop coil and IC chip. Each IC chip has ID information (e.g., a product name, manufacturer code, expiration date, etc.) stored therein in advance to represent the corresponding pharmaceutical 300.

The first antenna 250 is a device to transmit radio waves into the space surrounded by the bottom plate 210, the first side plate 220, the second side plate 230, and the back plate 240 to thereby activate the IC chip in the IC tag 310 attached to each pharmaceutical 300, and to receive the ID information representing the corresponding pharmaceutical 300. The ID information received by the first antenna 250 is managed by a control device (described later) in association with information indicating the time at which the corresponding pharmaceutical 300 has been carried in and/or out and a refrigerating temperature for the pharmaceutical 300. The first antenna 250 has a flat-plate shape.

The first side plate 220 has a depression 222 in its thickness direction (in the direction of the X-axis) to receive the first antenna 250. The depth of the depression 222 (in the direction of the X-axis) is larger than the thickness of the first antenna 250. In other words, the first antenna 250 does not protrude from the depression 222 when it is received by and secured to the depression 222. This is to avoid the first antenna 250 from failing to receive the ID information of the pharmaceutical(s) 300 correctly, due to reduction in reception sensitivity of the first antenna 250 caused by the pharmaceutical(s) 300 contacting the first antenna 250.

The first side plate 220 has ventilation holes 223 passing therethrough along its thickness direction such that the pharmaceutical(s) 300 can be effectively refrigerated by the air circulating in the inner case 120. The ventilation holes 223 each are in the form of, for example, a slit that is an elongated hole, and are aligned at regular intervals in areas on both sides (+Y side and −Y side) of the first antenna 250 such that the first antenna 250 is sandwiched therebetween.

The first side plate 220 is formed relatively thin for weight reduction. To prevent the first side plate 220 from bending, reinforcing ribs 224 are integrally formed with the first side plate 220, extending along its depth direction (in the direction of the Y-axis) on both sides of the first antenna 250 on the surface of the first side plate 220 on the left side (+X side) of the paper plane, while avoiding the ventilation holes 223.

Four first mating claws 225A to fit into four respective grooves 216A are formed at an edge of the first side plate 220 on the side thereof to be connected to the first end surface 211 of the bottom plate 210. At this edge, four insertion holes 225B to receive corresponding four protrusions 216B are formed. The first mating claws 225A are formed along the depth direction from the far side (+Y side) to the near side (−Y side) in their corresponding insertion holes 225B.

Four second mating claws 226A to fit into four respective grooves 217A are formed at an edge of the first side plate 220 on the side thereof not connected to the first end surface 211 of the bottom plate 210. At this edge, four insertion holes 226B to receive their corresponding four protrusions 217B are formed. The second mating claws 226A are formed along the depth direction from the far side (+Y side) toward the near side (−Y side) in their corresponding insertion holes 226B.

Bent parts 227 each extending toward the far side (in the +Y direction) and then being bent in the direction away from the second side plate 230 (in the +X direction) in an L shape to form a groove are formed on the end surface 221 of the first side plate 220 at both ends in its height direction (in the direction of the Z-axis) on the side to be connected to the back plate 240 (+Y side).

As such, the first side plate 220 is symmetrical with respect to the center line along its depth direction.

Second Side Plate

The second side plate 230 is a flat-plate-shaped member and is configured to be removably connected selectively to the first end surface 211 and the second end surface 212 of the bottom plate 210. The second side plate 230 is formed by molding with a mold and a resin material, as described above.

In order that the pharmaceutical(s) 300 can be effectively refrigerated by the air circulating in the inner case 120, the second side plate 230 has ventilation holes 232 passing therethrough along its thickness direction. The ventilation holes 232 each are, for example, a slit that is an elongated hole, and are aligned at regular intervals.

The second side plate 230 is formed relatively thin for weight reduction. To prevent the second side plate 230 from bending, reinforcing ribs 233 are integrally formed with the second side plate 230 on its surface on the right side (−X side) of the paper plane, extending along its height direction (in the direction of the Z-axis) and its depth direction (in the direction of the Y-axis) while avoiding the ventilation holes 232.

Four third mating claws 234A to fit into four respective grooves 217A are formed at an edge of the second side plate 230 on the side thereof to be connected to the second end surface 212 of the bottom plate 210. At this edge, four insertion holes 234B to receive their corresponding four protrusions 217B are formed. The third mating claws 234A are formed along the depth direction from the far side (+Y side) toward the near side (−Y side) in their corresponding insertion holes 234B.

Four fourth mating claws 235A to fit into four respective grooves 216A are formed at an edge of the second side plate 230 on the side thereof not connected to the second end surface 212 of the bottom plate 210. At this edge, four insertion holes 235B to receive corresponding four protrusions 216B are formed. The fourth mating claws 235A are formed along the depth direction from the far side (+Y side) toward the near side (−Y side) in their corresponding insertion holes 235B.

Bent parts 236 each extending toward the far side (in the +Y direction) then being bent in the direction away from the first side plate 220 (in the −X direction) in an L shape to form a groove are formed on the end surface 231 of the second side plate 230 at both ends in its height direction (in the direction of the Z-axis) on the side to be connected to the back plate 240 (+Z side).

As such, the second side plate 230 is symmetrical with respect to the center line along its depth direction.

Back Plate

The back plate 240 is a flat-plate-shaped member and is configured to be removably connected to the third end surface 213 of the bottom plate 210, the end surface 221 of the first side plate 210, and the end surface 231 of the second side plate 230. The back plate 240 is formed by molding with a mold and a resin material, as described above.

The second antenna 260 is a device to transmit radio waves into the space surrounded by the bottom plate 210, the first side plate 220, the second side plate 230, and the back plate 240 to thereby activate the IC chip in the IC tag 310 attached to each pharmaceutical 300, and to receive the ID information indicating the corresponding pharmaceutical 300. The ID information received by the second antenna 260 is managed by the control device (described later) in association with information indicating the time at which the corresponding pharmaceutical 300 has been carried in and/or out and a refrigerating temperature for the pharmaceutical 300. The second antenna 260 has a flat-plate shape.

Here, when the pharmaceutical 300 is placed on the bottom plate 210 such that the plane of its IC tag 310 is perpendicular to the surface of the first antenna 250 facing the second side plate 230. In that case, the radio waves emitted from the first antenna 250 do not propagate to the loop coil of the IC tag 310, which may result in the first antenna 250 being unable to correctly receive the ID information indicating the pharmaceutical 300 from the IC chip in the IC tag 310. More specifically, when the pharmaceutical 300 is placed on the bottom plate 210 such that the plane of its IC tag 310 is along the plane defined by the X- and Z-axes, the surface of the first antenna 250 facing the second side plate 230 (the surface along the plane defined by the Y- and Z-axes) is perpendicular to the plane of the IC tag 310 (the plane along the plane defined by the X- and Z-axes). Thus, the first antenna 250 may fail to correctly receive the ID information indicating the pharmaceutical 300 from the IC tag 310. For example, if the pharmaceutical 300 is sealed in a vial bottle and the IC tag 310 is attached to the side of the vial, the aforementioned issue becomes more pronounced.

Thus, the second antenna 260 is attached to the surface of the back plate 240 on the side directed to the bottom plate 210 such that the surface of the second antenna 260 facing the access opening 270 (the surface along the plane defined by the X- and Z-axes) is perpendicular to the surface of the first antenna 250 facing the second side plate 230 (the surface along the plane defined by the Y- and Z-axes). This makes it possible to correctly receive the ID information indicating the pharmaceutical 300 from the IC chip in the IC tag 310, even if the pharmaceutical 300 is placed on the bottom plate 210 in any direction about its Z-axis.

The back plate 240 has a depression 241 at its center in its thickness direction (in the direction of the Y-axis) to receive the second antenna 260. The depth of the depression 241 (in the direction of the Y-axis) is larger than the thickness of the second antenna 260. In other words, the second antenna 260 does not protrude from the depression 241 when it is received by and secured to the depression 241. This is to avoid the second antenna 260 from failing to correctly receive the ID information of the pharmaceutical(s) 300 due to the reduction in reception sensitivity of the second antenna 260 caused by the pharmaceutical(s) 300 contacting the second antenna 260.

In order that the pharmaceutical(s) 300 can be effectively refrigerated by the air circulating in the inner case 120, the back plate 240 has several ventilation holes 242 passing therethrough in its thickness direction. The ventilation holes 242 each are, for example, a slit that is an elongated hole, and are formed in areas on both sides of and adjacent to the depression 241.

The back plate 240 is formed relatively thin for weight reduction. To prevent the back plate 240 from bending, reinforcing ribs 243 are integrally formed with the back plate 240, extending along its width direction (in the direction of the X-axis) in an area in which ventilation holes 242 are formed in the surface of the back plate 240 facing the far side (+Y side) of the paper plane, while avoiding ventilation holes 242.

A depression 244 to receive a temperature data logger 400 is formed in the back plate 240 in an area, adjacent to the depression 241, on the left side (+X side) of the paper plane in FIG. 10A.

The temperature data logger 400 is a device to sequentially record data indicating temperatures in each of the pharmaceutical storage boxes 200A and 200B obtained during a predetermined sampling period. The temperature data logger 400 used in an embodiment of the present disclosure has a built-in temperature sensor 410 at the lower position of its case. The temperature sensor 410 obtains data indicating temperatures in the pharmaceutical refrigerator 100 through a sensing port 420. The temperature data logger 400 has a substantially parallel pipe shape, with protrusions 430A and 430B formed on its surfaces on the side toward the first side plate 220 (+X side) and the side toward the second side plate 230 (−X side), respectively.

The depression 244 has a mount 244C on which the temperature data logger 400 is to be placed, and support parts 244A and 244B that supports the protrusions 430A and 430B, respectively, so that the temperature data logger 400 received in the depression 244 does not come off. The support parts 244A and 244B are formed on the near side (−Y side) in the depth direction of the depression 244 (in the direction of the Y-axis).

The temperature data logger 400 is housed into the depression 244 in the depth direction with the protrusions 430A and 430B being positioned above (+Z side) the support parts 244A and 244B, and then the temperature data logger 400 is pushed toward the bottom plate 210 (−Z side) along its height direction (in the direction of the Z-axis). This causes the temperature data logger 400 to be mounted on the mount 244C such that the protrusions 430A and 430B face the support parts 244A and 244B, respectively. This allows the temperature data logger 400 to be received in the depression 244 without being come off therefrom.

Ventilation holes 244D are formed in the surface of the depression 244 facing the access opening 270. Furthermore, the temperature data logger 400 is mounted on the mount 244C, to thereby form a space around the sensing port 420 of the temperature sensor 410. This allows the temperature data logger 400 to record, with high accuracy, the data of temperatures in the space surrounded by the bottom plate 210, the first side plate 220, the second side plate 230, and the back plate 240 in each of the pharmaceutical storage boxes 200A and 200B placed in the pharmaceutical refrigerator 100. Further reinforcing ribs 243 are provided also on both sides of the depression 244 on the surface of the back plate 240 on the side opposite to the bottom plate 210 (+Y side).

Two mating claws 245A to fit into two respective grooves 227 are formed on an edge (the edge on the +X side) of the back plate 240 facing the end surface 221 of the first side plate 220. At this edge, two insertion holes 245B to receive corresponding bent parts 227 are formed. The mating claws 245A are formed from the upper side (+Z side) toward the lower side (−Z side) along the height direction in the corresponding insertion holes 245B.

Similarly, two mating claws 246A to fit into two respective grooves 236 are formed on an edge (the edge on the −X side) of the back plate 240 facing the end surface 231 of the second side plate 230. At this edge, two insertion holes 246B to receive corresponding bent parts 236 are formed. The mating claws 246A are formed from the upper side (+Z side) toward the lower side (−Z side) along the height direction in the corresponding insertion holes 246B.

In the back plate 240, two engagement claws 247 are formed at the positions facing the two depressions 218 formed in the third end surface 213 of the bottom plate 210, respectively. Each engagement claw 247 engages, by the elastic force, with a lower surface 218A of the corresponding depression 218 (a portion of the lower surface of the bottom plate 210).

Procedure for Assembling Pharmaceutical Storage Box 200A

First, the bottom plate 210, the first side plate 220, the second side plate 230, and the back plate 240 are prepared. Note that the temperature data logger 400 can be housed in advance into the depression 244 in the back plate 240 before assembling the pharmaceutical storage box 200B, or alternatively can be housed into the depression 244 in the back plate 240 after assembling the pharmaceutical storage box 200B.

Next, the first side plate 220 is then oriented with its edge on the side on which the first mating claws 225A are formed facing downward (−Z side) such that the first antenna 250 is on the side directed to the bottom plate 210. The four protrusions 216B on the first end surface 211 of the bottom plate 210 are inserted into the four respective insertion holes 225B in the first side plate 220, and then the first side plate 220 is slid toward the near side (in the −Y direction) of the bottom plate 210. This results in the four first mating claws 225A of the first side plate 220 being inserted into corresponding four grooves 216A in the bottom plate 210, to thereby connect the first side plate 220 to the bottom plate 210.

Then, the second side plate 230 is oriented with its edge on the side on which the third mating claws 234A are formed facing downward (−Z side) such that the surface of the second side plate 230 on the side on which no reinforcing ribs 233 are formed is on the side directed to the bottom plate 210. The four protrusions 217B on the second end surface 212 of the bottom plate 210 are inserted into the four respective insertion holes 234B in the second side plate 230, and then the second side plate 230 is slid toward the near side (in the −Y direction) of the bottom plate 210. This results in the four third mating claws 234A of the second side plate 230 are inserted into corresponding four grooves 217A in the bottom plate 210, to thereby connect the second side plate 230 to the bottom plate 210.

The back plate 240 is then oriented such that the second antenna 260 is on the side directed to the bottom plate 210. Subsequently, the two bent parts 227 of the first side plate 220 are inserted into the two respective insertion holes 245B in the back plate 240, and the two bent parts 236 of the second side plate 230 are inserted into the two respective insertion holes 246B in the back plate 240. From this state, the back plate 240 is slid downward (−Z side) along the height direction of the first side plate 220 and the second side plate 230. This results in the two mating claws 245A of the back plate 240 being inserted into the two respective grooves 227 in the first side plate 220, and the two mating claws 246A of the back plate 240 being inserted into the two respective grooves 236 in the second side plate 230, to thereby connect the back plate 240 to the first side plate 220 and the second side plate 230. Thereafter, when the back plate 240 is further slid downward along the height direction of the first side plate 220 and the second side plate 230, the two engagement claws 247 of the back plate 240 engage with the lower surfaces 218A of the depressions 218 by an elastic force while sliding within the two respective depressions 218 in the bottom plate 210, to thereby connect the back plate 240 to the bottom plate 210 as well.

This completes the assembly of the pharmaceutical storage box 200A. When removing the bottom plate 210, the first side plate 220, the second side plate 230, and the back plate 240 that form the pharmaceutical storage box 200A, an operator can follow the reverse of the above assembly procedure after the engagement claws 247 of the back plate 240 are disengaged from the lower surfaces 218A of the depressions 218 in the bottom plate 210.

Procedure for Assembling Pharmaceutical Storage Box 200B

First, similarly to the case of the pharmaceutical storage box 200A, the bottom plate 210, the first side plate 220, the second side plate 230, and the back plate 240 are prepared. The temperature data logger 400 can be housed in advance into the depression 244 in the back plate 240 before assembling the pharmaceutical storage box 200A or alternatively can be housed into the depression 244 in the back plate 240 after assembling the pharmaceutical storage box 200A Next, the first side plate 220 is then oriented, with its edge on the side on which the second mating claws 226A are formed being directed downward (−Z side), such that the first antenna 250 is on the side directed to the bottom plate 210. The four protrusions 217B on the second end surface 212 of the bottom plate 210 are inserted into the four respective insertion holes 226B in the first side plate 220, and then the first side plate 220 is slid toward the near side (in the −Y direction) of the bottom plate 210. This results in the four second mating claws 226A of the first side plate 220 being inserted into corresponding four grooves 217A in the bottom plate 210, to thereby connect the first side plate 220 to the bottom plate 210.

Then, the second side plate 230 is oriented with its edge on the side on which the fourth mating claws 235A are formed being directed downward (−Z side) such that the surface of the second side plate 230 on the side on which no reinforcing ribs 233 are formed is on the side directed to the bottom plate 210. The four protrusions 216B on the first end surface 211 of the bottom plate 210 are inserted into the four respective insertion holes 235B in the second side plate 230, and then the second side plate 230 is slid toward the near side (in the −Y direction) of the bottom plate 210. This results in the four fourth mating claws 235A of the second side plate 230 being inserted into corresponding four grooves 216A in the bottom plate 210, to thereby connect the second side plate 230 to the bottom plate 210.

Then, the back plate 240 is oriented such that the second antenna 260 is on the side directed to the bottom plate 210. Subsequently, the two bent parts 236 of the second side plate 230 are inserted into the two respective insertion holes 245B in the back plate 240, and the two bent parts 227 of the first side plate 220 are inserted into the two respective insertion holes 246B in the back plate 240. From this state, the back plate 240 is slid downward (−Z side) along the height direction of the first side plate 220 and the second side plate 230. This results in the two mating claws 245A of the back plate 240 being inserted into the two respective grooves 236 in the second side plate 230, and the two mating claws 246A of the back plate 240 being inserted into the two respective grooves 227 in the first side plate 220, to thereby connect the back plate 240 to the first side plate 220 and the second side plate 230. Thereafter, when the back plate 240 is further slid downward along the height direction of the first side plate 220 and the second side plate 230, the two engagement claws 247 of the back plate 240 engage with the lower surfaces 218A of the depressions 218 by an elastic force while sliding within the two respective depressions 218 in the bottom plate 210, to thereby connect the back plate 240 to the bottom plate 210 as well.

This completes the assembly of the pharmaceutical storage box 200B. When removing the bottom plate 210, the first side plate 220, the second side plate 230, and the back plate 240 that form the pharmaceutical storage box 200B, an operator can follow the reverse of the above assembly procedure after the engagement claws 247 of the back plate 240 are disengaged from the lower surfaces 218A of the depressions 218 in the bottom plate 210.

Arrangement of Pharmaceutical Storage Boxes in Pharmaceutical Refrigerator

Figure 14A:
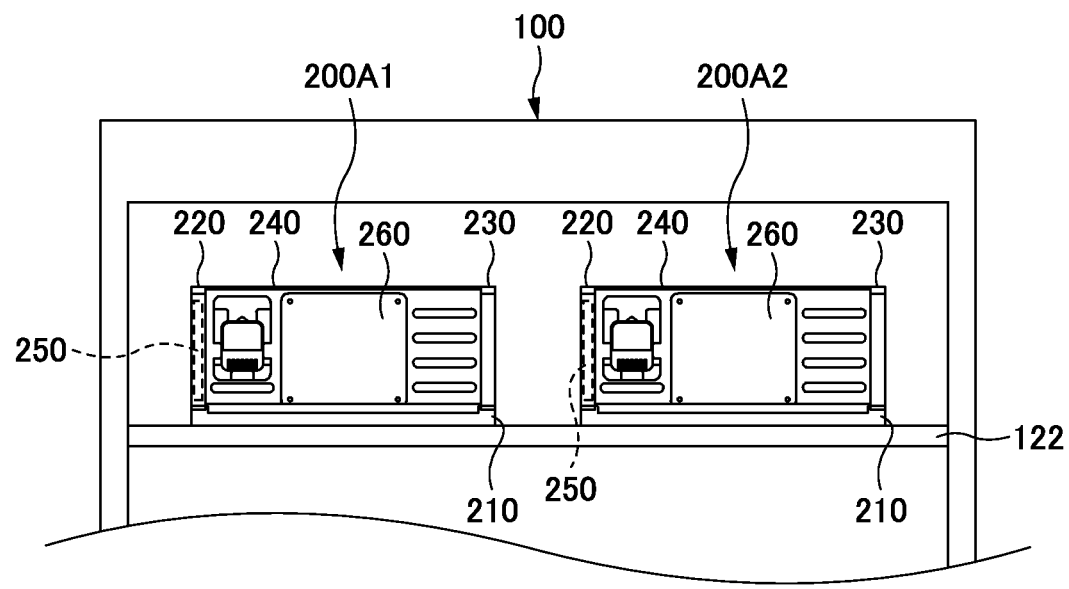
FIG. 14A illustrates front views of main components illustrating an arrangement of pharmaceutical storage boxes side by side in a pharmaceutical refrigerator.
Figure 14B:
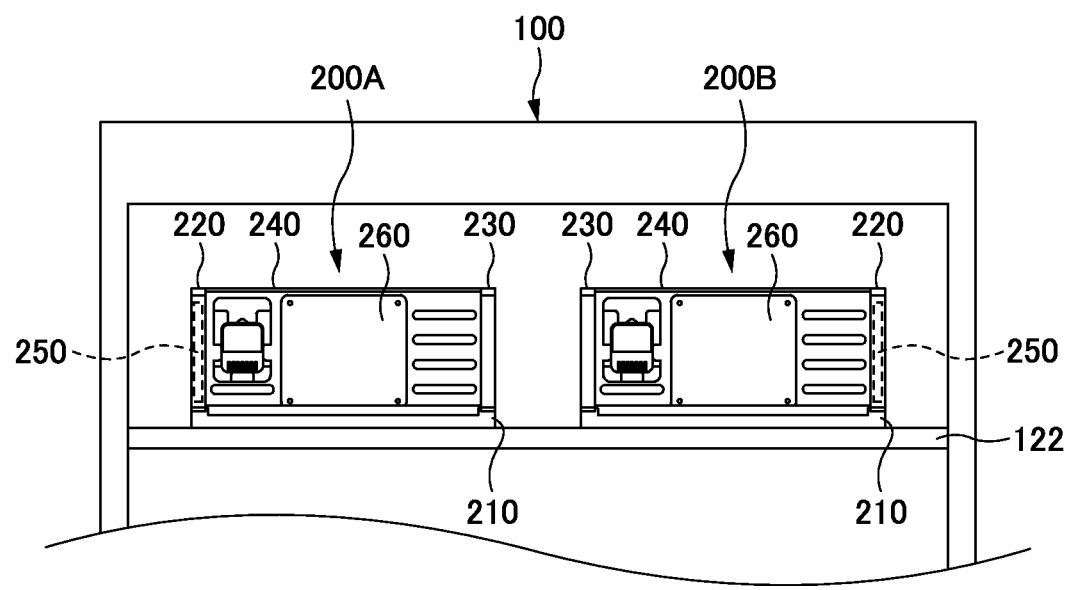
FIG. 14B illustrates front views of main components illustrating an arrangement of pharmaceutical storage boxes side by side in a pharmaceutical refrigerator.

FIG. 14A is a front view of main components illustrating an arrangement of, for example, two pharmaceutical storage boxes 200A side by side in the pharmaceutical refrigerator 100. For convenience of explanation, the one on the left side of the paper plane is referred to as "pharmaceutical storage box 200A1" and the other on the right side of the paper plane is referred to as "pharmaceutical storage box 200A2." FIG. 14B is a front view of main components illustrating an arrangement of a pharmaceutical storage box 200A and a pharmaceutical storage box 200B in the pharmaceutical refrigerator 100. For convenience of explanation, the door 140 of the pharmaceutical refrigerator 100 is omitted.

In FIG. 14A, the first side plate 220 of the pharmaceutical storage box 200A2 and the second side plate 230 of the pharmaceutical storage box 200A1 are adjacent to each other. Thus, the first antenna 250 in the pharmaceutical storage box 200A2 is located close to the pharmaceutical storage box 200A1. In this case, when the first antenna 250 and the second antenna 260 in the pharmaceutical storage box 200A1 try to receive information about pharmaceuticals 300 from their respective IC tags 310 attached to the pharmaceuticals 300 placed in the pharmaceutical storage box 200A1, the information stored in the IC tags 310 may not be correctly received due to radio wave reflection by the first antenna 250 in the pharmaceutical storage box 200A2. The same issue arises when two pharmaceutical storage boxes 200B are arranged side by side.

To address this issue, the pharmaceutical storage boxes 200A and 200B are assembled, one by one, so that the pharmaceutical storage box 200A is disposed on the left side of the paper plane, and the pharmaceutical storage box 200B is disposed on the right side of the paper plane, as illustrated in FIG. 14B. This results in the first antennas 250 in the pharmaceutical storage boxes 200A and 200B being away from each other, thereby eliminating the influence of radio waves caused by the first antennas 250 of the pharmaceutical storage boxes adjacent to each other. This makes it possible to correctly receive the information about the pharmaceuticals 300 from the IC tags 310 attached to the pharmaceuticals 300 both in the pharmaceutical storage boxes 200A and 200B.

According to an embodiment of the present disclosure, two types of pharmaceutical storage boxes 200A and 200B can be easily assembled using the identical bottom plates 210, first side plates 220, second side plates 230, and back plates 240. Thus, it is possible to quickly adapt to the arrangement of the pharmaceutical storage boxes 200A and 200B in the pharmaceutical refrigerator 100.

Pharmaceutical Management System

Figure 15:
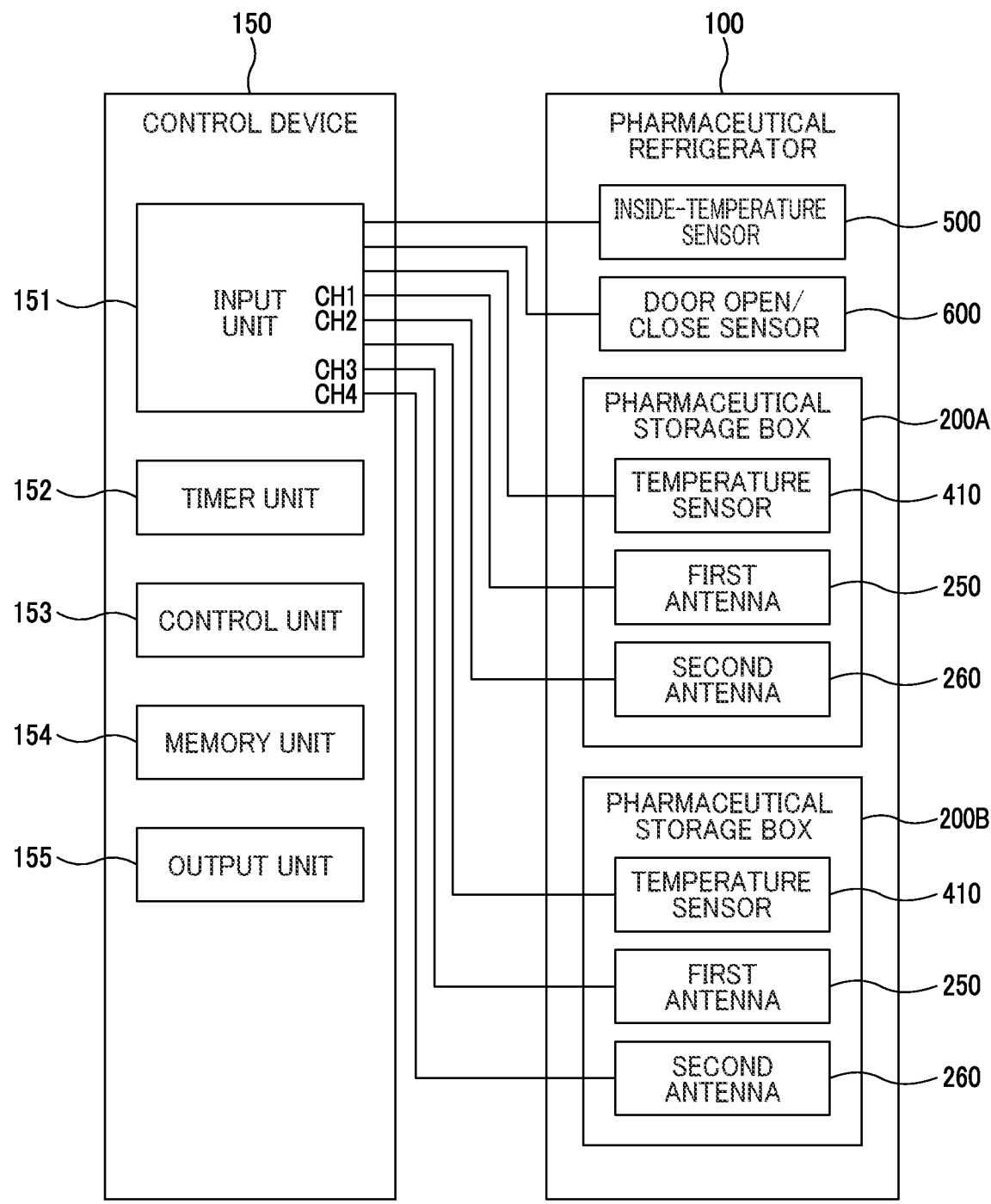
FIG. 15 is a block diagram illustrating an example of a pharmaceutical management system in which a pharmaceutical storage box according to an embodiment of the present disclosure is to be used.

FIG. 15 is a block diagram illustrating an example of a pharmaceutical management system in which the pharmaceutical storage box(es) according to an embodiment of the present disclosure is/are to be used.

A pharmaceutical management system 1 is used to manage ID information indicating the pharmaceuticals 300 stored in the pharmaceutical storage box(es) 200A, 200B in the pharmaceutical refrigerator 100 in association with information about the opening and closing of the door of the pharmaceutical refrigerator 100, information about temperatures inside the refrigerator, information about refrigerating temperatures in the pharmaceutical storage boxes 200A and 200B, and the information about the entry/exit of the pharmaceuticals 300.

The pharmaceutical management system 1 is configured such that a control device 150 is communicatively connected with a door open/close sensor 600 and an inside-temperature sensor 500 that are provided to the pharmaceutical refrigerator 100, the temperature sensor(s) 410 of the temperature data logger(s) 400 that are attached to the pharmaceutical storage box(es) 200A, 200B, and the first antenna(s) 250 and second antenna(s) 260 that are attached to the pharmaceutical storage box(es) 200A, 200B.

The control device 150 includes an input unit 151, a timer unit 152, a control unit 153, a memory unit 154, and an output unit 155.

The input unit 151 receives information about the opening and closing of the door from the door open/close sensor 600 of the pharmaceutical refrigerator 100, information about temperatures inside the refrigerator from the inside-temperature sensor 500, and information about temperatures in the pharmaceutical storage box(es) 200A, 200B from the temperature sensor 410. The input unit 151 also receives ID information indicating the pharmaceutical(s) 300 from the first antenna(s) 250 and the second antenna(s) 260.

The timer unit 152 measures the current time.

The control unit 153 periodically obtains ID information indicating the pharmaceutical(s) 300 from the first antenna(s) 250 and the second antenna(s) 260 according to a predetermined sampling period. For example, when the control unit 153 first obtains ID information indicating the pharmaceutical 300 from the first antenna 250 and the second antenna 260, the control unit 153 determines that the pharmaceutical 300 has been carried in and regards the time at this moment as the time at which the pharmaceutical 300 has been carried in. Additionally, when the control unit 153 becomes unable to obtain the ID information indicating the pharmaceutical 300 from the first antenna 250 and the second antenna 260, the control unit 153 determines that the pharmaceutical 300 has been carried out, and regards the time at this moment as the time at which that pharmaceutical 300 has been carried out. Then, the control unit 153 performs processing to associate ID information of the pharmaceutical 300 with information about the opening and closing of the door of the pharmaceutical refrigerator 100, information about temperatures inside the refrigerator, information about temperatures in the pharmaceutical storage box(es) 200A, 200B, and information about the time at which the pharmaceutical 300 has been carried in/out.

The memory unit 154 stores information associated by the control unit 153.

The output unit 155 outputs the associated information in response to an external instruction.

The functions of the control unit 153 are implemented by executing programs stored in the memory unit 154.

In this way, it is possible to manage pharmaceutical(s) 300 and the pharmaceutical storage box(es) 200 to store the pharmaceutical(s).

Here, the control unit 153 has, for example, 4-channel input ports CH1 to CH4 to obtain ID information from the IC tags 310. For example, when the pharmaceutical storage boxes 200A and 200B are placed on the shelf 122, a total of four cables are connected to the above-mentioned 4-channel input ports CH1 to CH4, which four cables are two cables connected to the first antenna 250 and the second antenna 260 provided to the pharmaceutical storage box 200A, and another two cables connected to the first antenna 250 and the second antenna 260 provided to the pharmaceutical storage box 200B.

The control unit 153 obtains ID information to be input thereto sequentially and repeatedly in the order of the input ports CH1, CH2, CH3, and CH4, according to the predetermined sampling time. Note that the order in which the ID information is obtained at the input ports CH1 to CH4 is not limited to the above, and may be set as appropriate in advance.

Accordingly, the present disclosure is directed to provision of a general-purpose pharmaceutical storage box that is to be placed in a pharmaceutical refrigerator and capable of managing information about the entry and exit of pharmaceuticals and other information with high accuracy.

According to the present disclosure, it becomes possible to prepare a pharmaceutical storage box in which the positions of a first side plate thereof with an antenna and a second side plate thereof without an antenna are reversible between the left and right sides when being connected to the bottom plate thereof, according to the position at which the pharmaceutical storage box is to be placed in a pharmaceutical refrigerator, thereby being able to manage information about the entry and exit of pharmaceuticals and other information with high accuracy.

An embodiment of the present disclosure described above is simply to facilitate understanding of the present disclosure and is not in any way to be construed as limiting the present disclosure. The present disclosure may variously be changed or altered without departing from its main features and encompass equivalents thereof.

What is claimed is:

1. A pharmaceutical storage box to be stored in a pharmaceutical refrigerator so as to be freely movable in and out of the pharmaceutical refrigerator, the pharmaceutical storage box being managed by a control device, the pharmaceutical storage box comprising:
   a bottom plate on which a pharmaceutical is to be placed thereon, the pharmaceutical having an IC tag attached thereto;
   a first side plate having a first antenna attached thereto, the first antenna being configured to receive information of the IC tag, the first side plate being configured to be removably connected to a first end surface of the bottom plate such that the first antenna is on the side directed to the bottom plate;
   a second side plate configured to be removably connected to a second end surface of the bottom plate such that the second side plate faces the first side plate; and
   a back plate configured to be removably connected to a third end surface of the bottom plate such that the back plate is sandwiched between the first side plate and the second side plate, wherein
   the first side plate has a first connection structure that is connectable to the second end surface such that the first antenna is on the side directed to the bottom plate, with positions of an edge of the first side plate on a side to be connected to the first end surface and an edge thereof on an opposite side not to be connected to the first end surface being reversed, and wherein
   the second side plate has a second connection structure that is connectable to the first end surface with positions of an edge of the second side plate on a side to be connected to the second end surface and an edge thereof on an opposite side not to be connected to the second end surface being reversed.

2. The pharmaceutical storage box according to claim 1, wherein
   the bottom plate has,
   at the first end surface, a first mating protrusion to be connected selectively to the first side plate and the second side plate; and,
   at the second end surface, a second mating protrusion to be connected selectively to the first side plate and the second side plate, and wherein
   the first side plate has, as the first connection structure, a first mating claw formed at the edge thereof on the side to be connected to the first end surface, the first mating claw being configured to mate with the first mating protrusion, and
   a second mating claw formed at the edge thereof on the side not to be connected to the first end surface, the second mating claw being configured to mate with the second mating protrusion,
   the first side plate being symmetrical with respect to a center line along a depth direction of the pharmaceutical storage box,
   the second side plate has, as the second connection structure,
   a third mating claw formed at the edge thereof on the side to be connected to the second end surface, the third mating claw being configured to mate with the second mating protrusion, and
   a fourth mating claw formed at the edge thereof on the side not to be connected to the second end surface, the fourth mating claw being configured to mate with the first mating protrusion,
   the second side plate being symmetrical with respect to a center line along a depth direction of the pharmaceutical storage box.

3. The pharmaceutical storage box according to claim 2, wherein
   the first side plate has a first groove formed at an end surface thereof on a side to be connected to the back plate,
   the second plate has a second groove formed at an end surface thereof on a side to be connected to the back plate, and
   the back plate has mating claws configured to mate with the first groove and the second groove, respectively.

4. The pharmaceutical storage box according to claim 3, wherein the back plate has an engagement claw at an end surface thereof on a side to be connected to the bottom plate, the engagement claw being configured to engage with a surface of the bottom plate opposite a surface on which the pharmaceutical is to be placed.

5. The pharmaceutical storage box according to claim 1, wherein a second antenna is attached to the back plate on a surface thereof on the side directed to the bottom plate, the second antenna being configured to receive information of the IC tag.

6. The pharmaceutical storage box according to claim 1, wherein each of the bottom plate, the first side plate, the second side plate, and the back plate has a plurality of ventilation holes.

7. The pharmaceutical storage box according to claim 1, wherein a temperature data logger is attached to the back plate on a surface thereof on the side directed to the bottom plate.

* * * * *